United States Patent
Cecil et al.

(10) Patent No.: US 11,698,033 B2
(45) Date of Patent: Jul. 11, 2023

(54) VALVE TRAIN SYSTEM FOR EXTENDED DURATION INTAKE VALVE OPENING

(71) Applicant: Cummins Inc., Columbus, IN (US)

(72) Inventors: Adam C. Cecil, Columbus, IN (US); Richard J. Gustafson, Columbus, IN (US)

(73) Assignee: Cummins Ins., Columbus, IN (US)

( * ) Notice: Subject to any disclaimer, the term of this patent is extended or adjusted under 35 U.S.C. 154(b) by 0 days.

(21) Appl. No.: 17/449,992

(22) Filed: Oct. 5, 2021

(65) Prior Publication Data

US 2022/0025825 A1 Jan. 27, 2022

Related U.S. Application Data

(63) Continuation of application No. PCT/US2020/027068, filed on Apr. 7, 2020.

(60) Provisional application No. 62/846,415, filed on May 10, 2019.

(51) Int. Cl.
| | | |
|---|---|---|
| *F02D 13/02* | (2006.01) | |
| *F01L 1/047* | (2006.01) | |
| *F01L 1/18* | (2006.01) | |
| *F01L 1/24* | (2006.01) | |

(52) U.S. Cl.
CPC .......... *F02D 13/0234* (2013.01); *F01L 1/047* (2013.01); *F01L 1/18* (2013.01); *F01L 1/24* (2013.01); *F01L 2001/2444* (2013.01)

(58) Field of Classification Search
None
See application file for complete search history.

(56) References Cited

U.S. PATENT DOCUMENTS

| | | | | |
|---|---|---|---|---|
| 5,036,810 A | * | 8/1991 | Meneely | F01L 13/065 123/321 |
| 6,220,213 B1 | * | 4/2001 | Haas | F01L 1/18 123/90.16 |
| 6,253,730 B1 | * | 7/2001 | Gustafson | F01L 13/065 123/321 |
| 6,386,160 B1 | | 5/2002 | Meneely et al. | |
| 6,883,492 B2 | | 4/2005 | Vanderpoel et al. | |
| 7,140,333 B2 | | 11/2006 | Persson et al. | |
| 7,150,272 B2 | | 12/2006 | Persson | |
| 7,156,062 B2 | | 1/2007 | Vanderpoel | |

(Continued)

OTHER PUBLICATIONS

International Search Report and Written Opinion, PCT Appln. No. PCT/US20/27068, dated Jul. 16, 2020, 8 pgs.

(Continued)

*Primary Examiner* — Devon C Kramer
*Assistant Examiner* — Wesley G Harris
(74) *Attorney, Agent, or Firm* — Taft, Stettinius & Hollister LLP

(57) ABSTRACT

A variable valve timing assembly is provided for extending a duration of an intake valve opening. The variable valve timing assembly includes an intake rocker mounted on a pedestal and operable by a cam lobe to open and close the intake valve. The intake rocker includes a lever extension, and a holding member in the pedestal is lockable in position by a hydraulic circuit in the pedestal to contact the lever extension of the intake rocker and hold the intake valve in the open position. A reset pin in the pedestal is actuatable by the cam lobe to release the holding member to allow the intake valve to close.

20 Claims, 48 Drawing Sheets

(56) References Cited

U.S. PATENT DOCUMENTS

| | | | |
|---|---|---|---|
| 7,434,556 | B2 | 10/2008 | Harmon |
| 7,827,958 | B2 * | 11/2010 | Dietrich ............... F01L 13/065 |
| | | | 123/321 |
| 8,151,763 | B2 | 4/2012 | Meistrick et al. |
| 8,375,904 | B2 | 2/2013 | Gustafson |
| 8,516,984 | B2 | 8/2013 | Schwoerer |
| 8,695,546 | B2 | 4/2014 | Choi |
| 8,776,738 | B2 | 7/2014 | Vorih et al. |
| 8,820,276 | B2 | 9/2014 | Vorih et al. |
| 9,163,566 | B2 | 10/2015 | Le Forestier et al. |
| 9,506,382 | B2 | 11/2016 | Yeager et al. |
| 9,790,824 | B2 | 10/2017 | Baltrucki et al. |
| 2008/0223325 | A1 * | 9/2008 | Meistrick .............. F01L 13/065 |
| | | | 123/90.46 |
| 2011/0197834 | A1 | 8/2011 | Gustafson |
| 2017/0145876 | A1 | 5/2017 | Pham |
| 2019/0072011 | A1 | 3/2019 | Cecur et al. |
| 2020/0080450 | A1 * | 3/2020 | Schwoerer ......... F01L 13/0015 |

OTHER PUBLICATIONS

"European Extended Search Report, EP Appln. No. 20805539.2, dated Nov. 14, 2022 8 pgs.", European Extended Search Report, EP Appln. No 20805539.2, dated Nov. 14, 2022 8 pgs.

Chinese Office Action With English Translation, Chinese Appln. No. 202080034726.0 14 pgs., dated Mar. 14, 2023.

* cited by examiner

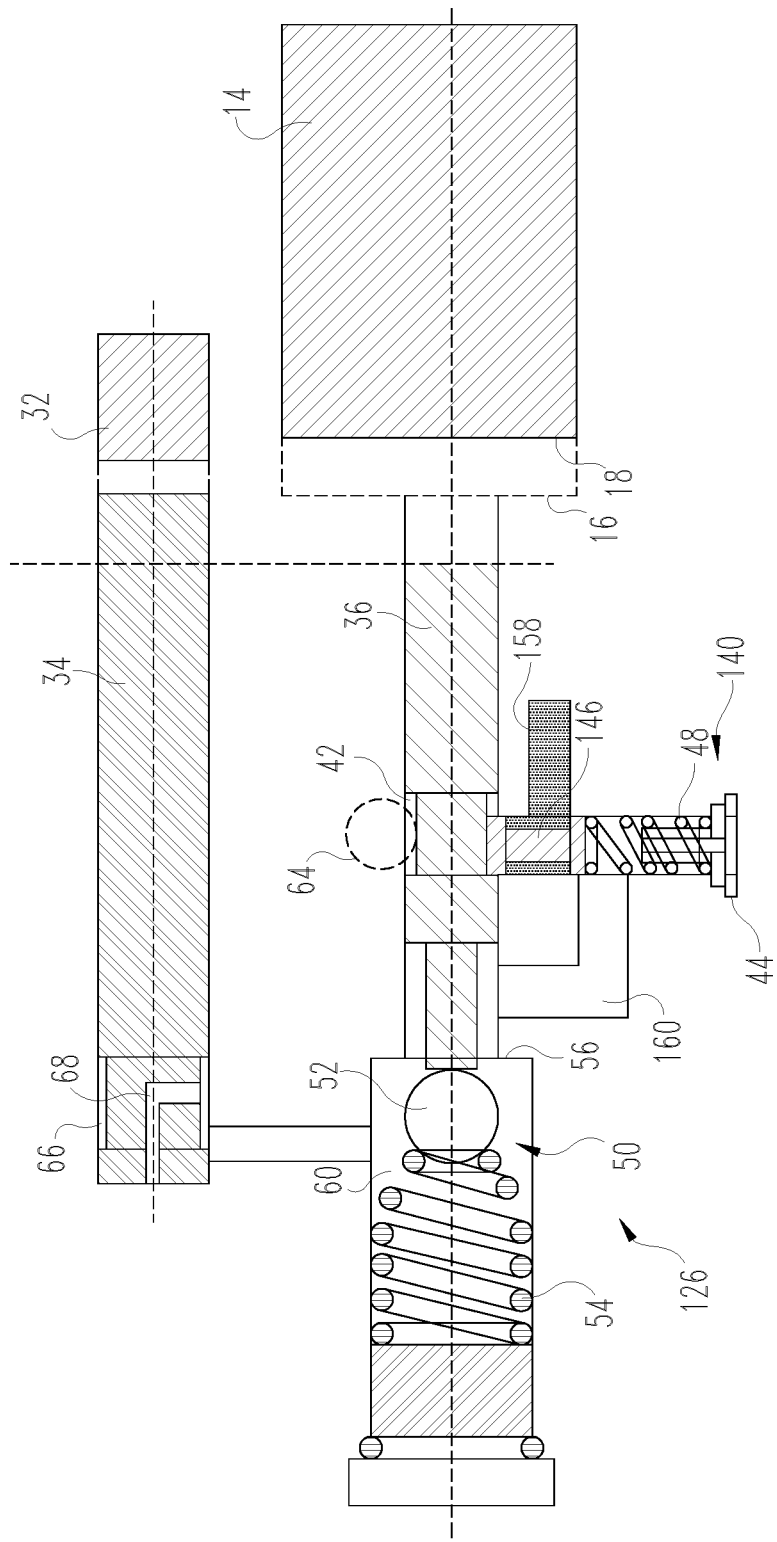

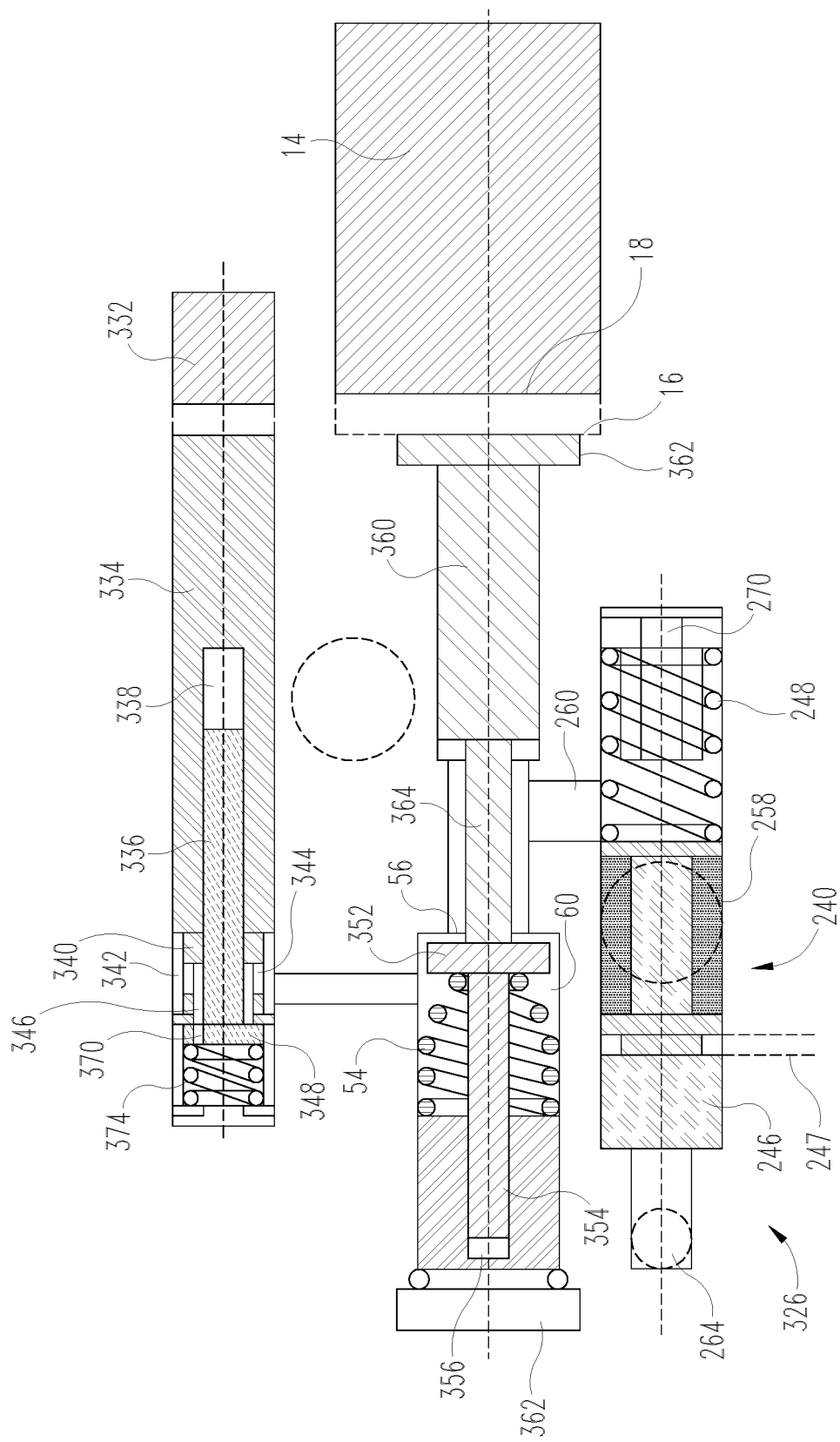

VALVE TRAIN SYSTEM FOR EXTENDED DURATION INTAKE VALVE OPENING

CROSS-REFERENCE TO RELATED APPLICATIONS

The present application is a continuation of International Patent Application Serial No. PCT/US20/27068, filed Apr. 7, 2020 which claims priority to and benefit of U.S. Provisional Patent Application No. 62/846,415 filed May 10, 2019, the entire disclosures of which are incorporated herein by reference.

TECHNICAL FIELD

The present disclosure relates generally to valve train systems for an internal combustion engine, and more particularly but not exclusively to a valve train system for extending a duration of an intake valve opening in response to one or more operating conditions.

BACKGROUND

Internal combustion engines can utilize a Miller cycle to reduce parasitic pumping losses and fuel consumption rate. A Miller cycle can be performed by controlling the intake valve closing using an early intake valve closing (EIVC) or late intake valve closing (LIVC) strategy. One example of EIVC, LIVC and a variable valve timing (VVT) assembly and method is disclosed in U.S. Pat. No. 8,375,904 which is incorporated herein by reference. However, further improvements in this technology area to improve the intake valve operations in response to an extended intake valve opening duration event are desired.

SUMMARY

The present application incorporates a VVT assembly for LIVC and/or EIVC of the intake valve in response to an extended intake valve opening duration event, such as a transient operating condition of internal combustion engine. The VVT assembly includes a lever extension extending from a modified intake rocker that is operable by a cam shaft to open and close an intake valve of a cylinder of the internal combustion engine. The lever extension of the intake rocker is in contact with a holding member that is operable to extend the open duration of the intake valve during the intake stroke of the piston in the combustion chamber. The holding member is normally unlocked and/or held in a retracted position in the pedestal of the intake rocker to allow the intake rocker to pivot to close the intake valve after the cam lobe passes the rocker roller during a standard Miller cycle mode of operation.

In response to an extended duration mode of operation, the holding member is actuated to extend from the pedestal to contact the lever extension and hold the intake rocker in a pivoted position that corresponds to the intake valve opening, and therefore does not allow the intake valve to close even after the cam lobe passes the rocker roller. The VVT assembly also includes a reset pin extending from the pedestal that is contacted by the cam lobe to release the actuated holding member to allow it to retract back into the pedestal, which in turn releases the intake rocker and allows the intake valve to close. The reset pin is located so the intake valve closing can be completed after bottom-dead-center of the intake stroke.

The present application further describes various embodiments of hydraulic circuits that include a solenoid selectively pressurizing fluid in the hydraulic circuit for releasing the reset pin to extend from the pedestal to contact the cam. Flow paths and components are also provided that control the flow of fluid between the reset pin and the holding member to actuate the holding member from the pedestal, lock the holding member in an extended position in contact with the lever extension of the intake rocker, and to release the locked holding member.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

FIGS. 7A-7H show another embodiment of a hydraulic circuit for operating the variable valve timing system of FIGS. 1-5F with diagrams showing various crank angle conditions.

DESCRIPTION OF ILLUSTRATIVE EMBODIMENTS

Figure 1:
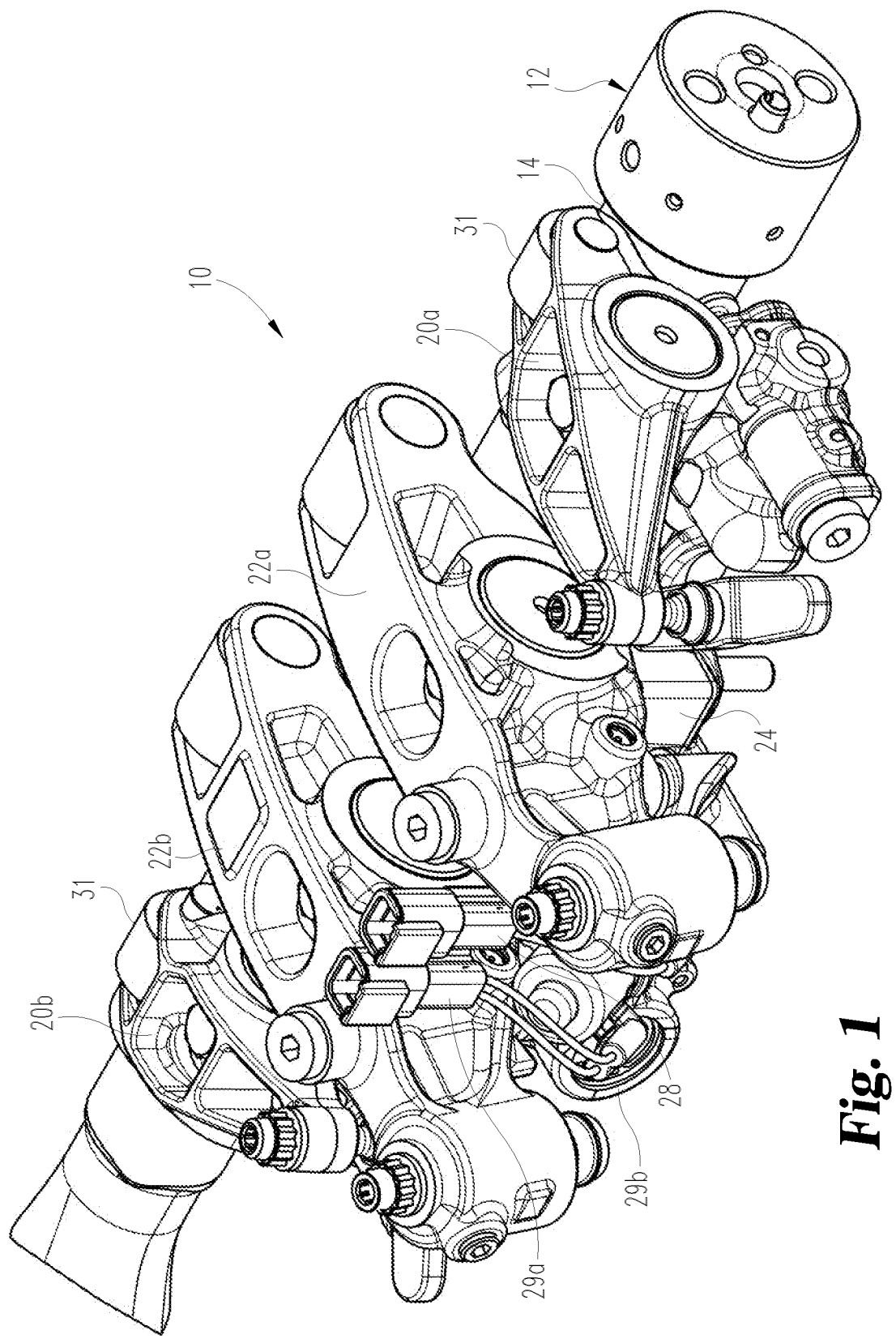
FIG. 1 is an isometric view of a cam shaft and intake/exhaust valve assembly for a cylinder head that includes a variable valve timing system for the intake valve according to the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 5A:
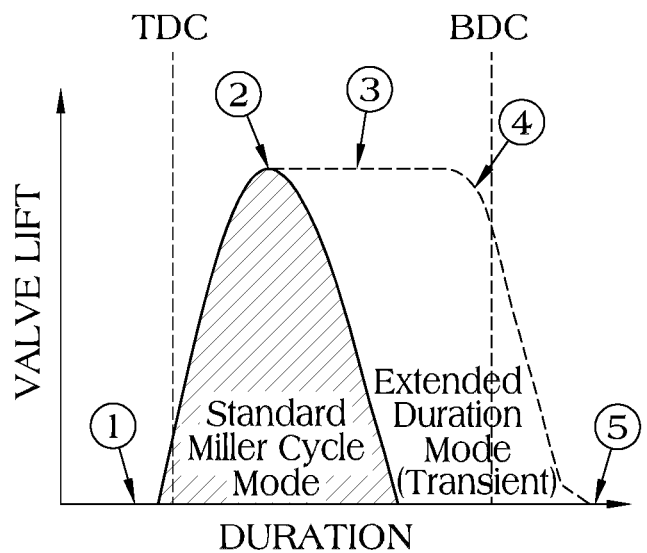
FIGS. 5A-5F show an extended duration mode of operation for one intake valve of the intake/exhaust valve assembly using the variable valve timing system of FIGS. 1-4.
Figure 5B:
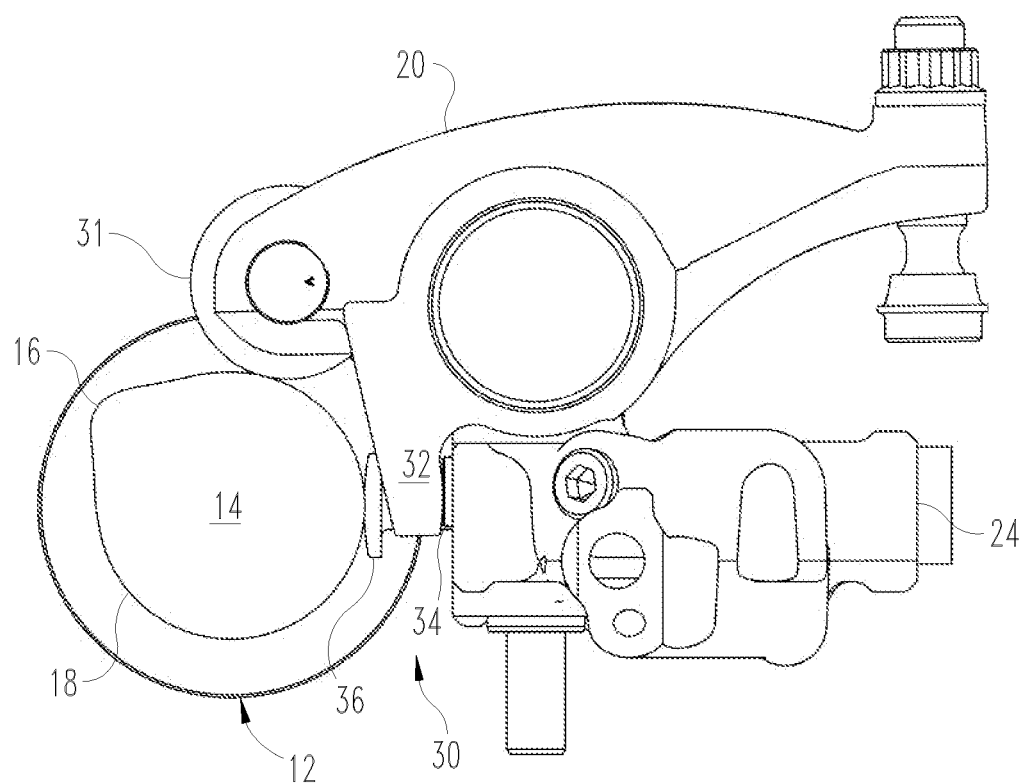

In one embodiment of the present application, FIG. 1 depicts a segment of a cam shaft and intake/exhaust valve assembly 10, which comprises a cam shaft 12 that includes one or more cams 14 having one or more cam lobes 16 extending from a base circle 18 (FIG. 5B.) The assembly 10 also includes first and second intake rockers 20a, 20b (collectively and individually referred to as intake rockers 20) that operate respective pairs of intake valves (not shown), and first and second exhaust rockers 22a, 22b (collectively and individually referred to as exhaust rockers 22) that operate respective pairs of exhaust valves (not shown). The intake valve pairs control air flow into a combustion chamber (not shown) of a cylinder of an internal combustion engine (not shown), and the exhaust valves control exhaust flow out of the cylinder. It should be understood that FIG. 1 depicts an arrangement for two cylinders of an internal combustion engine, but additional segments can be provided for additional cylinders. In addition, each of the segments can be arranged for two cylinders as shown, arranged for a single cylinder, or arranged for more than two cylinders.

Figure 2:
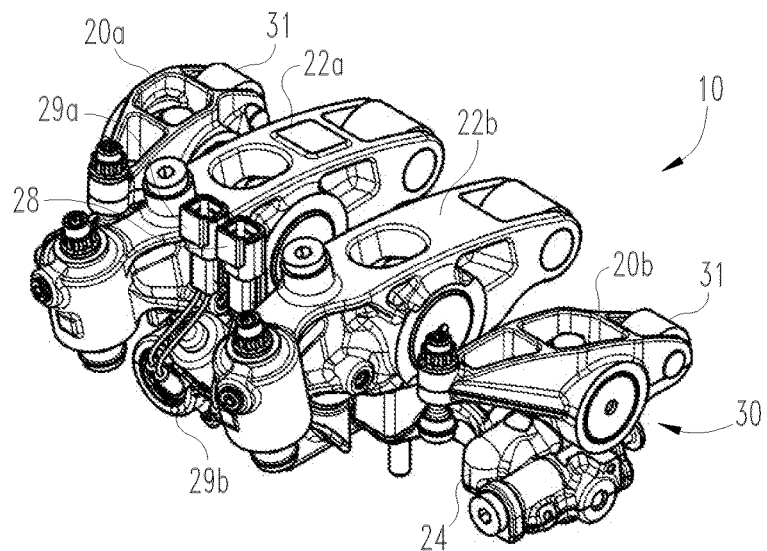
FIG. 2 is the view of FIG. 1 with the cam shaft removed.
Figure 3:
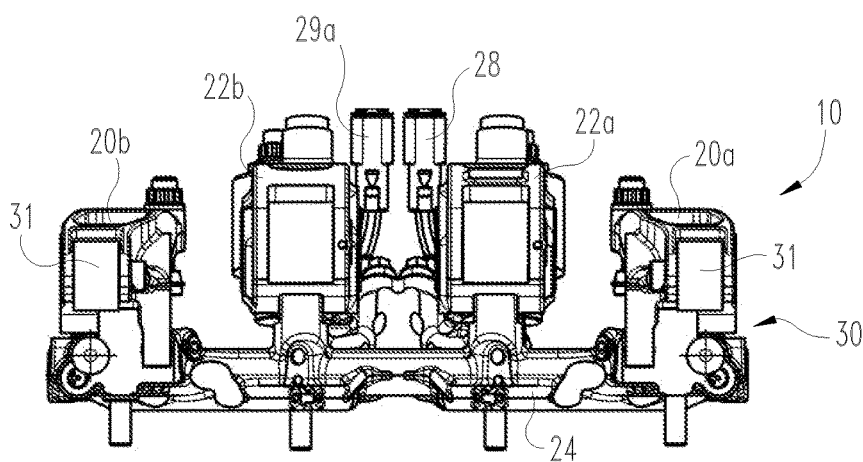
FIG. 3 is a rear side view of FIG. 2.
Figure 4:
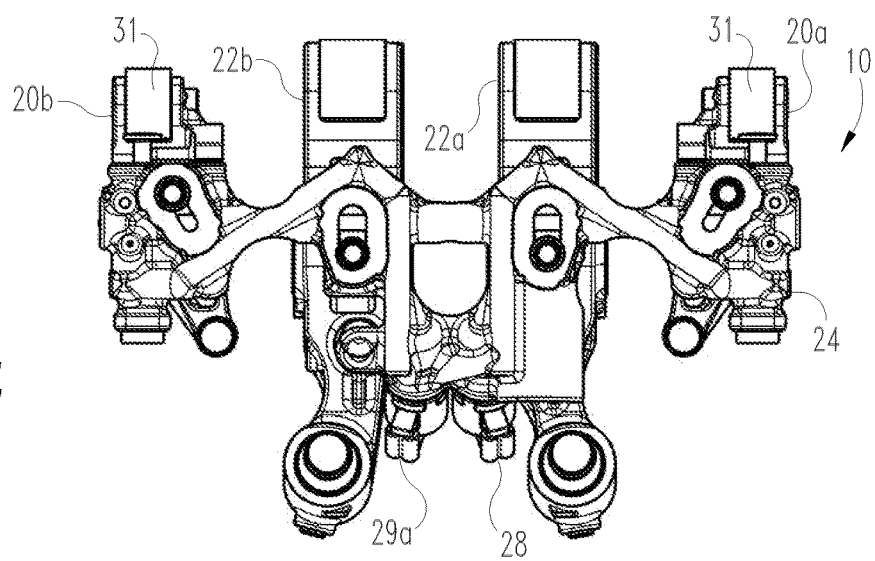
FIG. 4 is a bottom view of FIG. 2.

Referring further to FIGS. 2-4, the rockers 20, 22 are mounted on a pedestal 24 which includes a hydraulic circuit 26 (discussed further below, see FIG. 6A) for controlling operation of the rockers 20, 22 and of a variable valve timing assembly 30. The hydraulic circuit 26 includes a solenoid 28 operable to selectively pressurize the fluid in the hydraulic circuit. Operation of the hydraulic circuit 26 according to various embodiments will be discussed further below. Another solenoid 29a can be provided with an accumulator 29b for operation of a hydraulic circuit for brake actuation.

Each of the intake rockers 20 includes a rocker roller 31 that is normally in contact with a respective cam 14 of the cam shaft 12. During a normal or nominal mode of operation, the intake valves are opened and closed by the cam 14 operating on the respective intake rocker 20 through rocker roller 31 using a standard Miller cycle mode of operation.

The present disclosure includes VVT assembly 30 to provide an extended duration mode of operation in which the opening of the intake valves is extended from the normal or nominal Miller cycle opening duration, such as shown in FIG. 5A. The extended duration mode can occur, for example, in response to one or more operating conditions indicating a transient condition, such as an accelerator tip-in, is occurring or about to occur. However, initiation of the extended duration mode may be initiated in response to any desired operating condition in which a performance benefit is desired.

VVT assembly 30 includes a lever extension 32 (FIG. 5B) extending from intake rocker 20 that is contactable by a holding member 34, such as an actuator piston or the like, that is extendable into and out of the pedestal 24. The holding member 34 is lockable in the extended position via hydraulic circuit 26 to prevent intake rocker 20 from pivoting on pedestal 24 to close the intake valve. VVT assembly 30 also includes a reset pin 36 in the pedestal 24 that is actuatable by the cam lobe 16 to release the holding member 34 and allow the intake valve to close.

FIGS. 5B through 5F reflect the configuration of the VVT assembly 30 at each of the positions 1 through 5 depicted on the valve opening diagram of FIG. 5A. In FIG. 5B, position 1 on FIG. 5A is shown in which the roller 31 resides on the base circle 18 of cam 14. In this position, holding member 34 is retracted into, or movable into and out of, the pedestal 24. If an extended duration operating mode is initiated, reset pin 36 may be actuated by fluid pressure from hydraulic circuit 26 to project outwardly from the pedestal 24 at initiation of the extended duration mode of operation to contact the base circle 18. Prior to its actuation, or during a normal or stand Miller cycle mode of operation, the reset pin 36 can be retracted into pedestal 24 so that it is normally spaced from base circle 18, while cam lobe 16 may slightly contact reset pin 36 as it passes by.

Figure 5C:
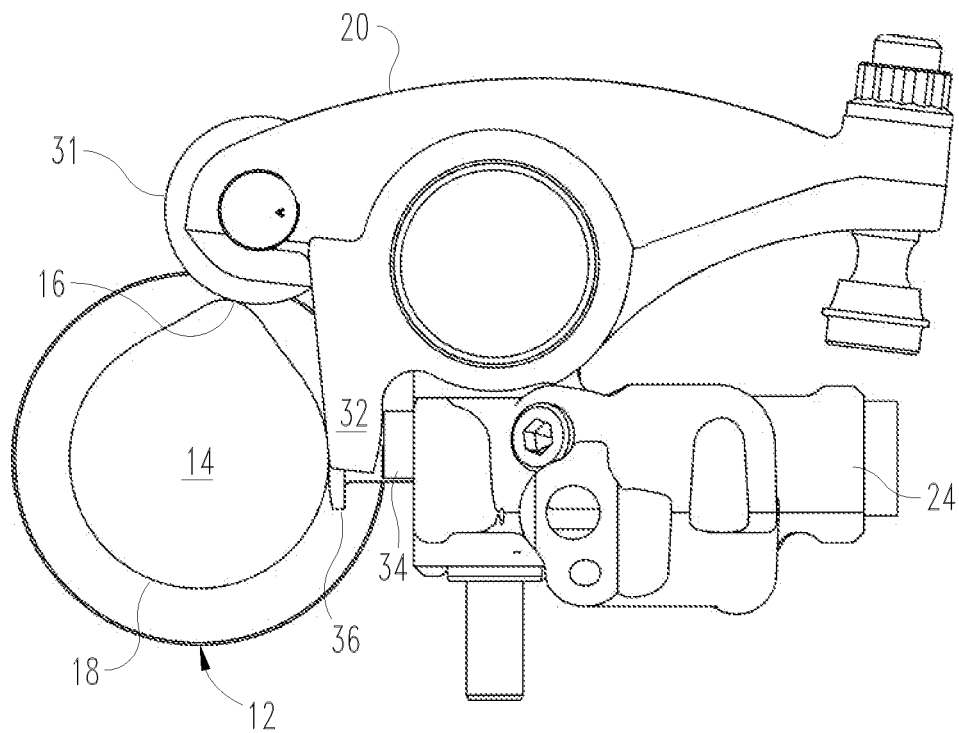

In FIG. 5C, position 2 on FIG. 5A is shown in which the roller 31 resides on the cam lobe 16 of cam 14 to provide peak lift of the intake valve connected to intake rocker 20. In this position, holding member 34 is extended from the pedestal 24 and locked in this position by fluid pressure in the hydraulic circuit 26. In the extended position, holding member 34 contacts the lever extension 32 extending from intake rocker 20. Reset pin 36 remains actuated to project outwardly from the pedestal 24 and in contact with the base circle 18.

Figure 5D:
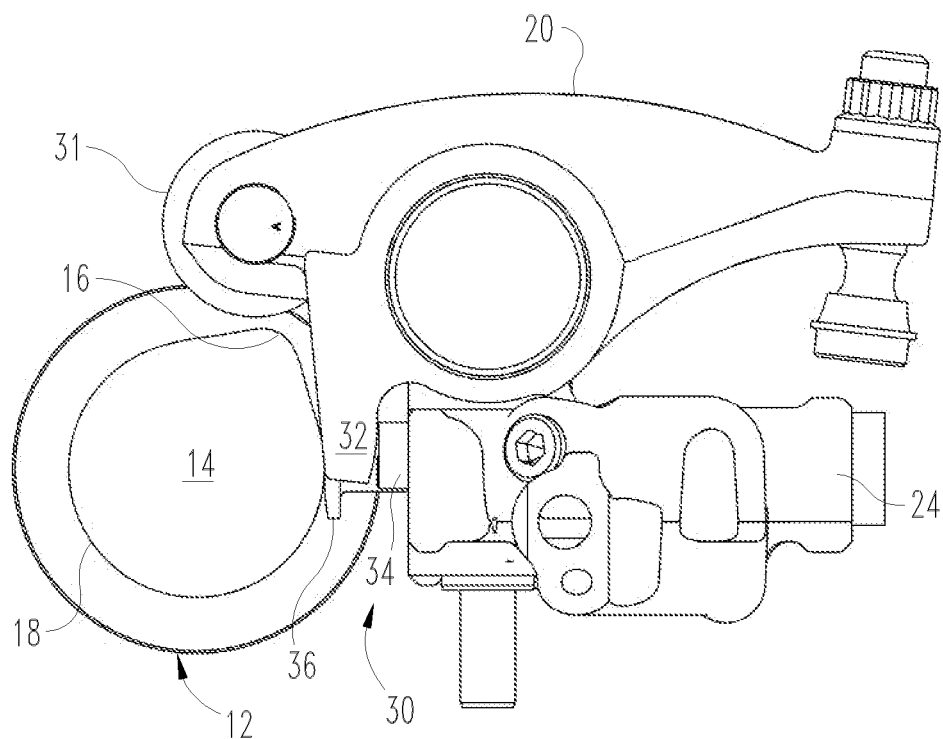

In FIG. 5D, position 3 on FIG. 5A is shown in which the roller 31 is spaced from cam 14 to maintain peak lift of the intake valve. In this position, holding member 34 remains locked in an extended position from the pedestal 24 and remains in contact with the lever extension 32 of intake rocker 20. Reset pin 36 also remains actuated to project outwardly from the pedestal 24 and in contact with the base circle 18 of cam 14.

Figure 5E:
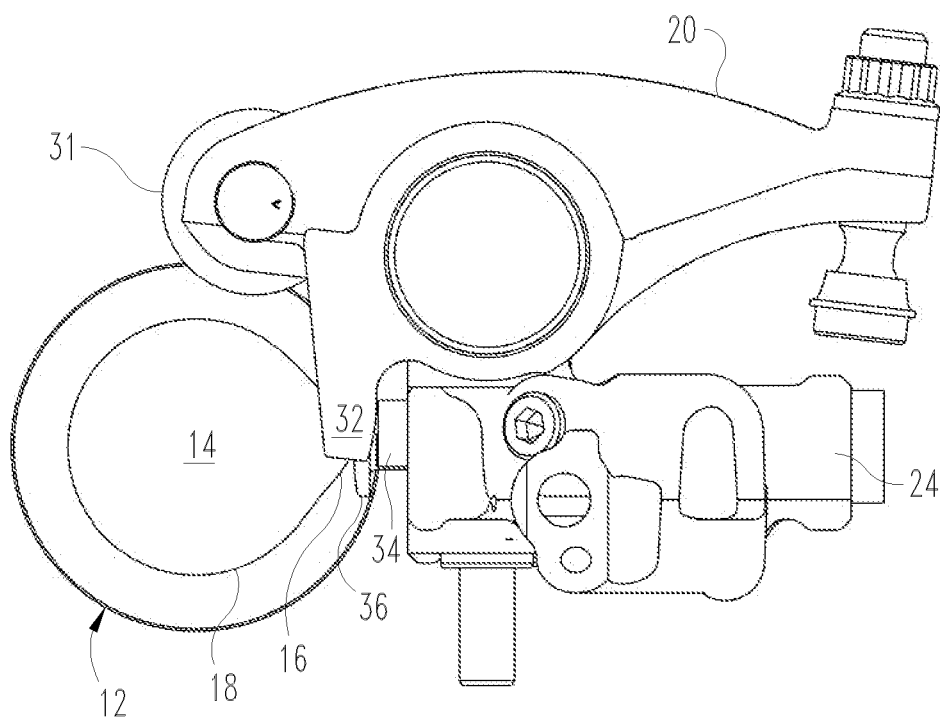
Figure 5F:
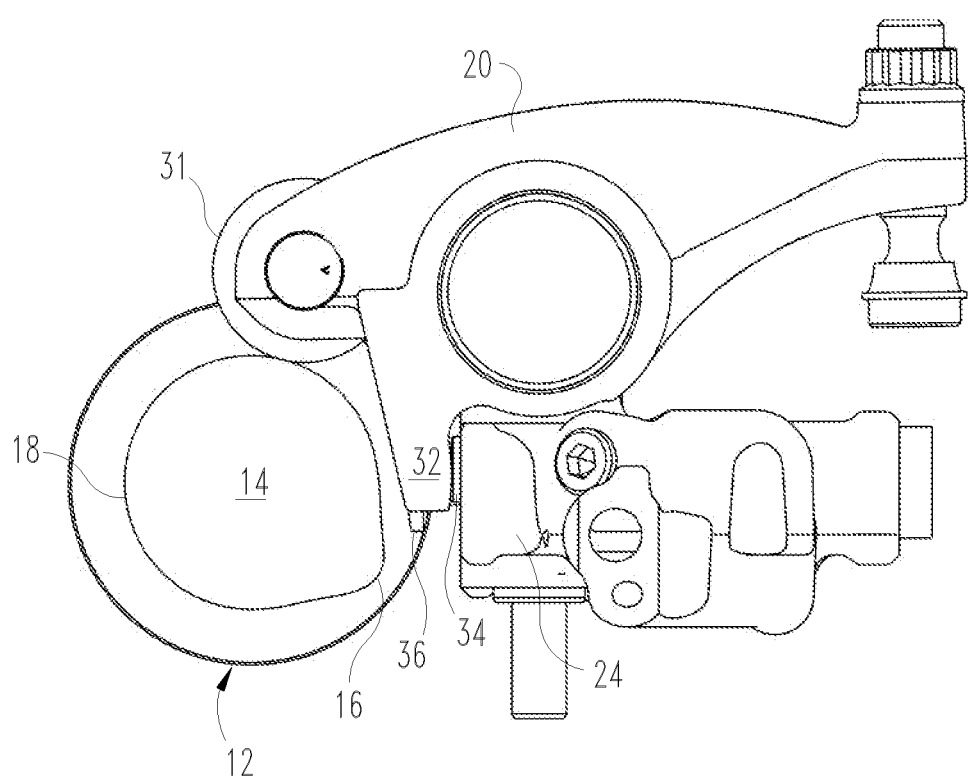

In FIG. 5E, position 4 on FIG. 5A is shown in which the roller 31 remains spaced from cam 14 to maintain peak lift of the intake valve. The cam 14 has now rotated sufficiently so that cam lobe 16 contacts the reset pin 36 and depresses reset pin 36 into pedestal 24. This in turn causes a release of the fluid pressure in hydraulic circuit 26 that is locking holding member 34 in the extended position, allowing holding member 34 to retract into pedestal 24, as shown in FIG. 5F corresponding to position 5 on FIG. 5A. The reset pin 36 is moved back into pedestal 24 for re-engagement in the retracted position.

In position 5 in which the holding member 34 is movable, intake rocker 20 is allowed to pivot to close the intake valve and so that roller 31 contacts base circle 18 of cam 14. Reset pin 36 is also maintained in the retracted position in the pedestal 24 by an actuating member that is actuated by the hydraulic pressure, and remains locked in the retracted position until re-actuated with hydraulic circuit 26 in response to a determination to enter the extended duration mode of operation.

Figure 6A:
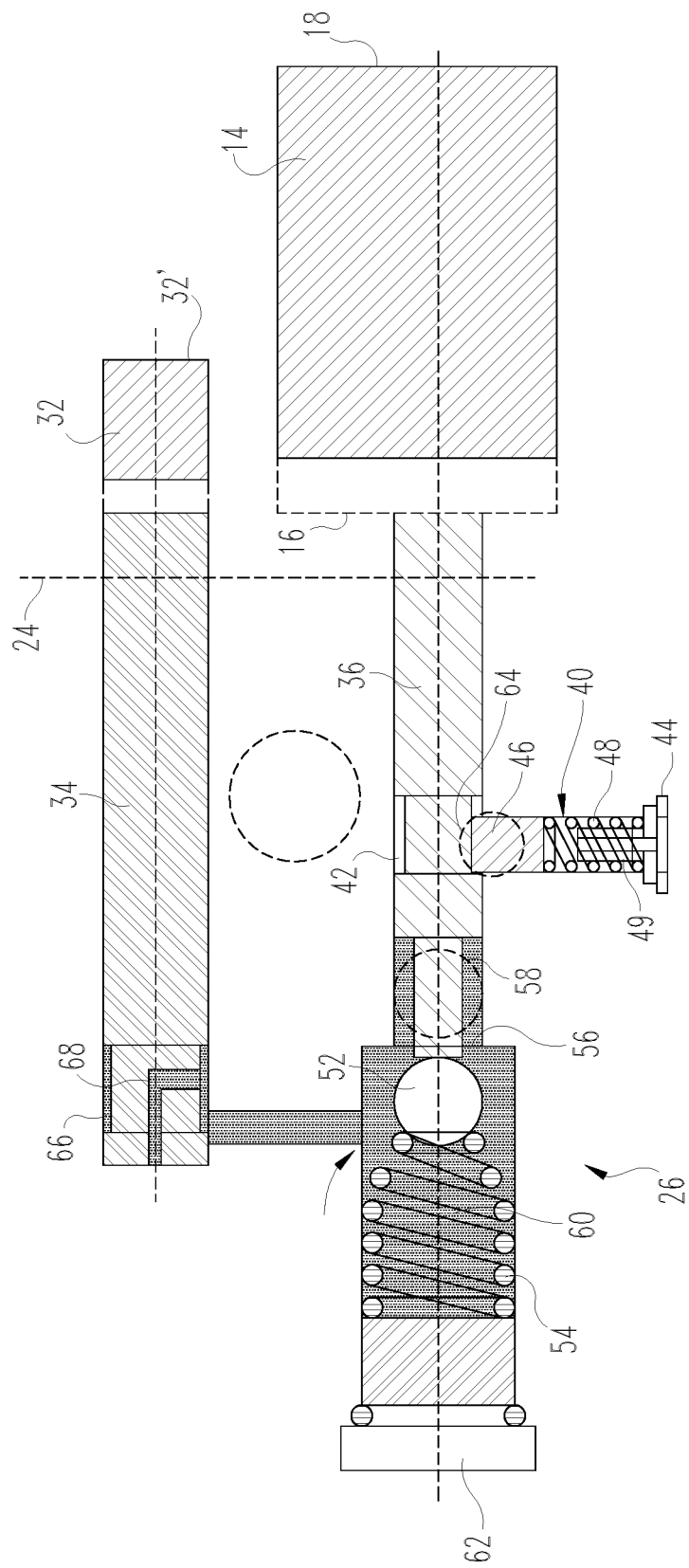
FIGS. 6A-6H show an embodiment of a hydraulic circuit for operating the variable valve timing system of FIGS. 1-5F with diagrams showing various crank angle conditions.

In FIGS. 6A-6H, one embodiment of hydraulic circuit 26 is shown. As shown in FIG. 6A, hydraulic circuit 26 includes an actuating member 40 that is normally biased into engagement in a groove 42 of reset pin 36. In one embodiment, a spring assembly 48 is provided that extends between an actuator piston 46 and a snap ring 44 around a vent plug 49. The actuator piston 46 fits in groove 42 around reset pin 36 to prevent reset pin 36 from being extended from pedestal 24 via fluid pressure in the hydraulic circuit 26. The ball 52 and spring 54 form a valve assembly 50 that can be closed against a seat 56 to prevent fluid flow to and from the overhead fluid supply 58 from fluid cavity 60. Spring 54 can be retained in pedestal 24 using a plug 62 that seals the fluid cavity 60 in which the valve assembly 50 resides.

In FIG. 6A the hydraulic circuit 26 is non-active and actuating member 40 is engaged to reset pin 36 in groove 42 to hold reset pin 36 retracted into pedestal 24. The holding member 34 can also be retracted in pedestal 24 or allowed to move into and out of pedestal 24 as intake rocker 20 pivots so that the holding member 34 follows the extension lever 32 of intake rocker 20 at all times.

Figure 6B:
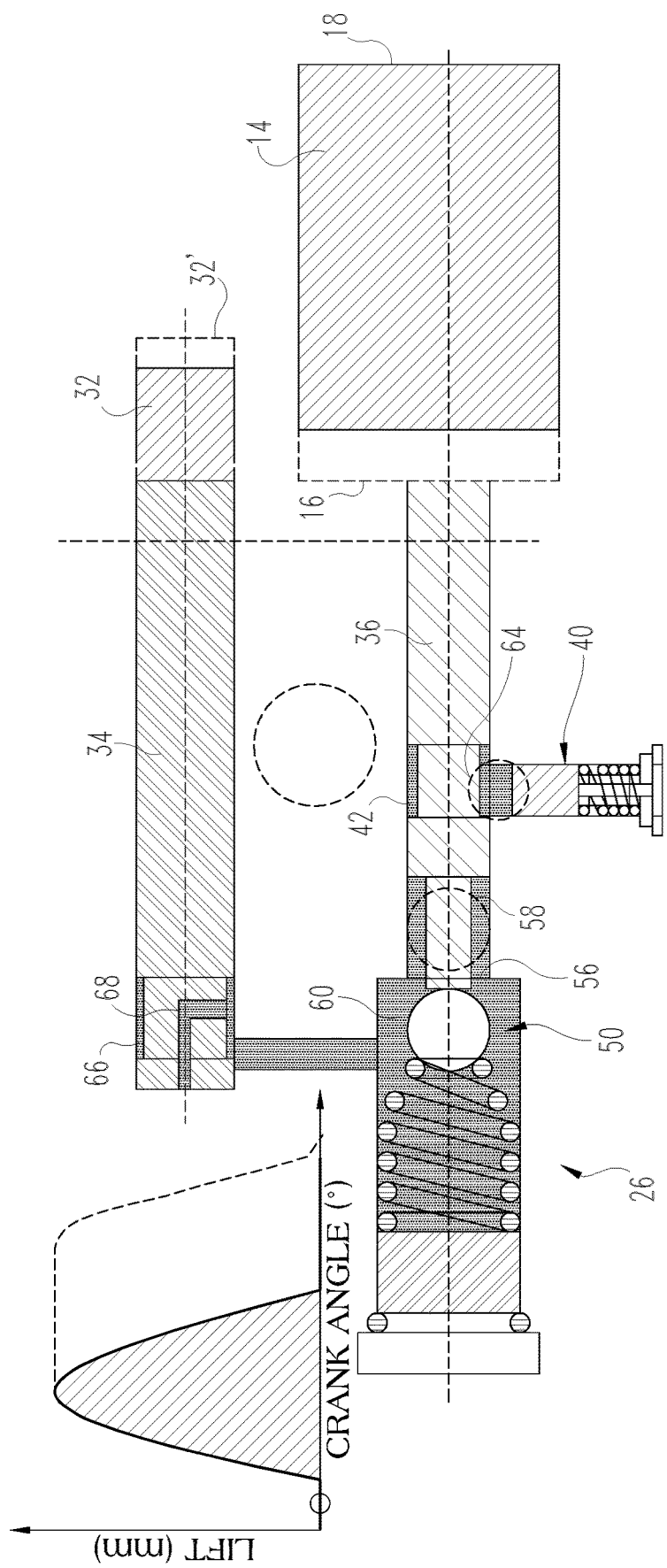
Figure 6C:
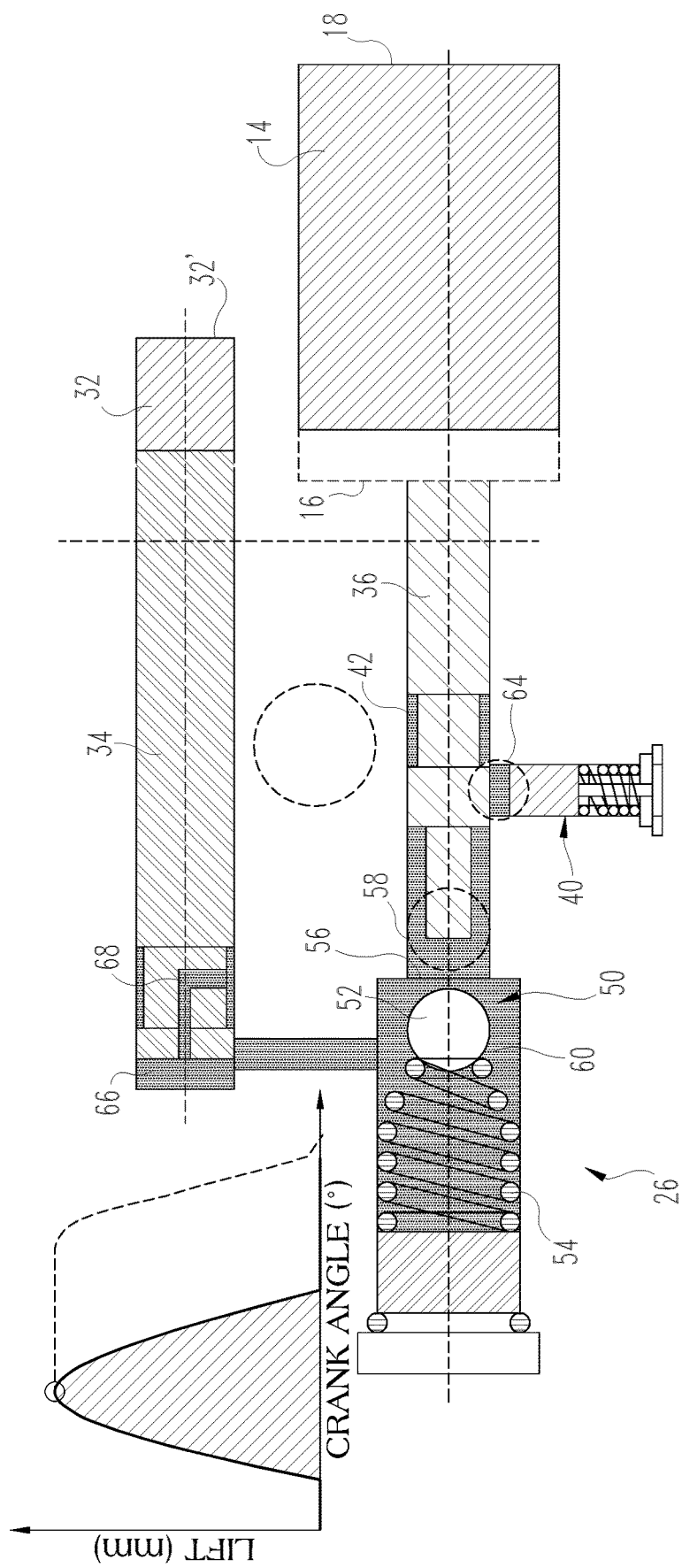

In FIG. 6B the hydraulic circuit 26 is active and pressurized control fluid is supplied to groove 42 from a control fluid supply 64 connected to solenoid 28. The pressurized control fluid displaces actuating member 40 out of groove 42. This in turn allows reset pin 36 to be forced out of pedestal 24 into an extended position as shown in FIG. 6C due to the force from the pressurized fluid in cavity 60 behind the inner end of reset pin 36. In the extended position, the outer end of reset pin 36 contacts cam 14 on base circle 18. The pressurized fluid in cavity 60 also flows to chamber 66 in which holding member 34 resides so that holding member 34 is locked in an extended position against lever extension 32, maintaining it in a peak lift position 32'.

Figure 6D:
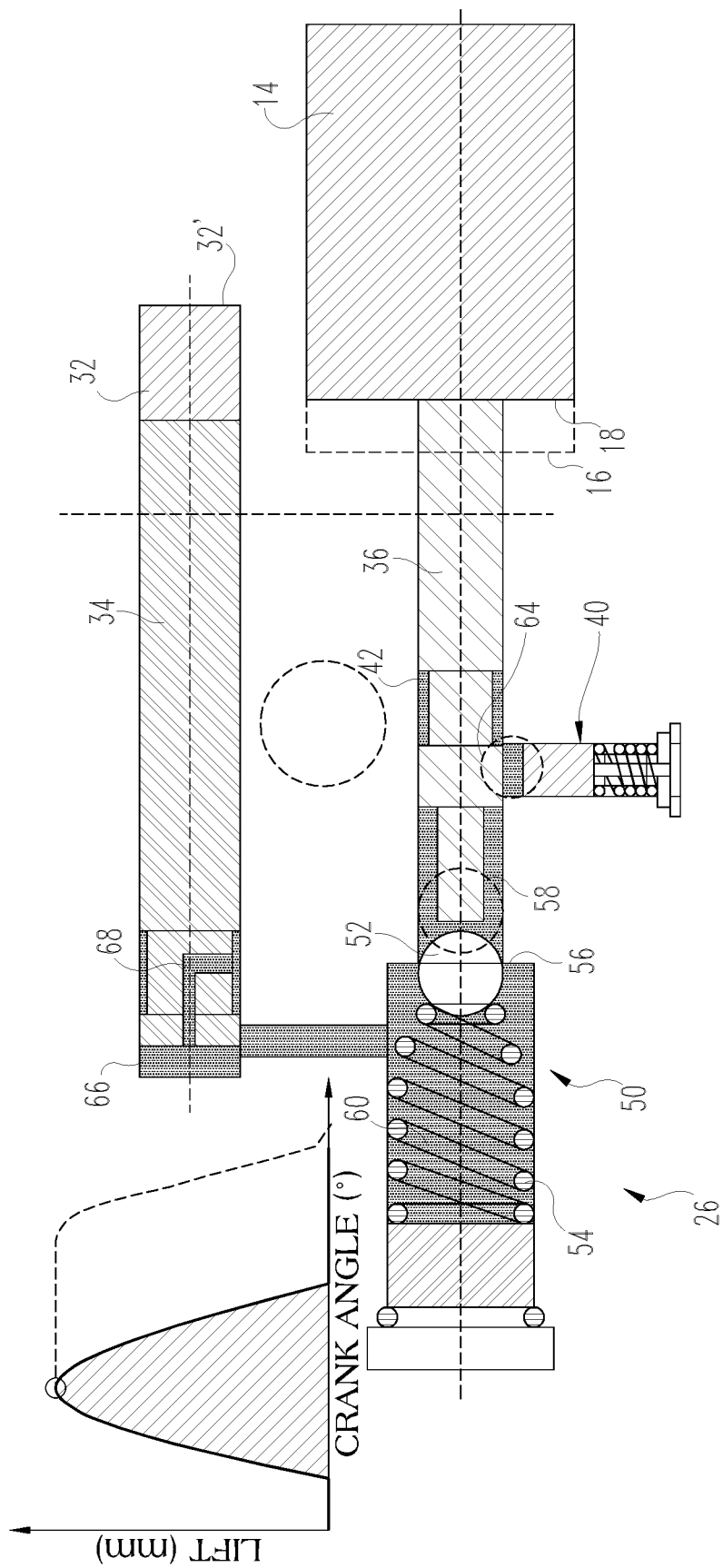
Figure 6E:
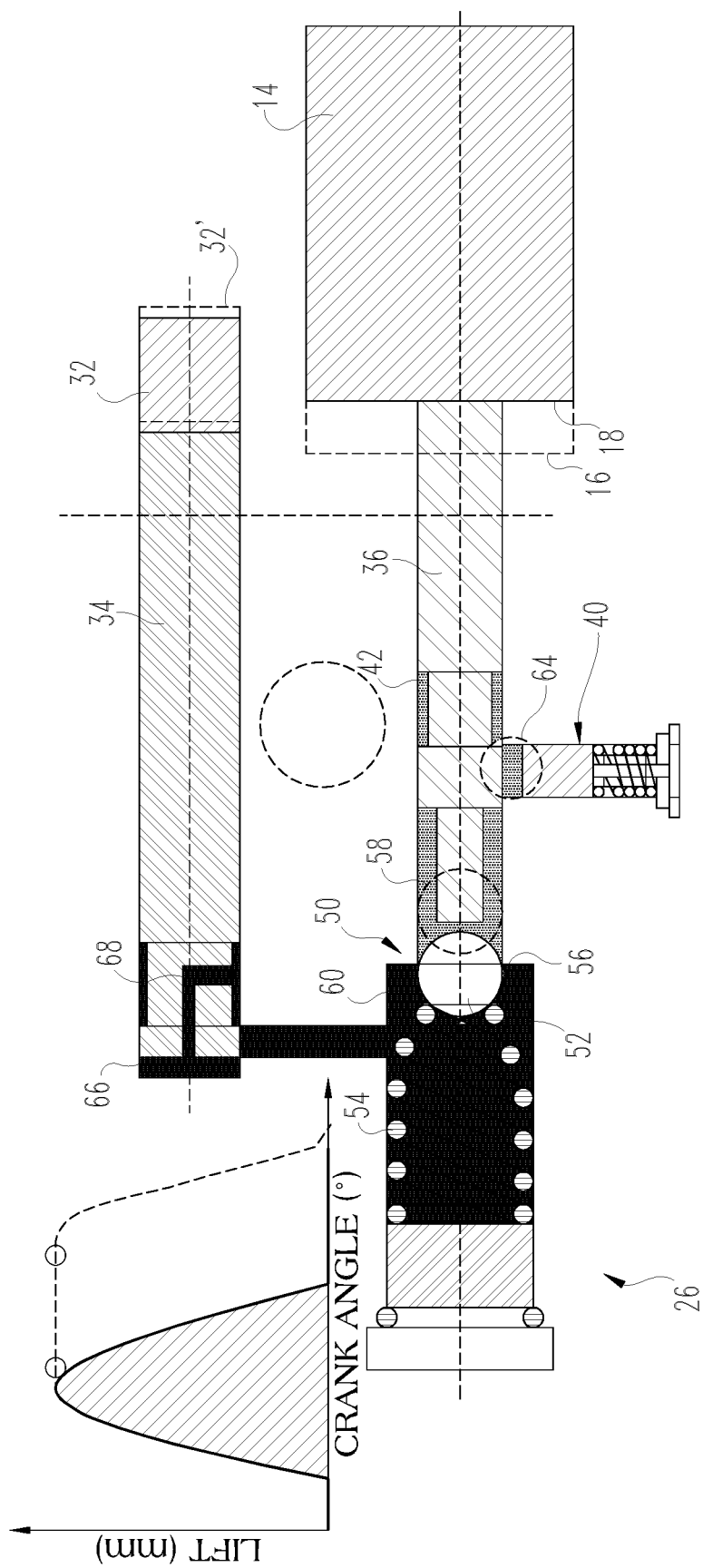
Figure 6F:
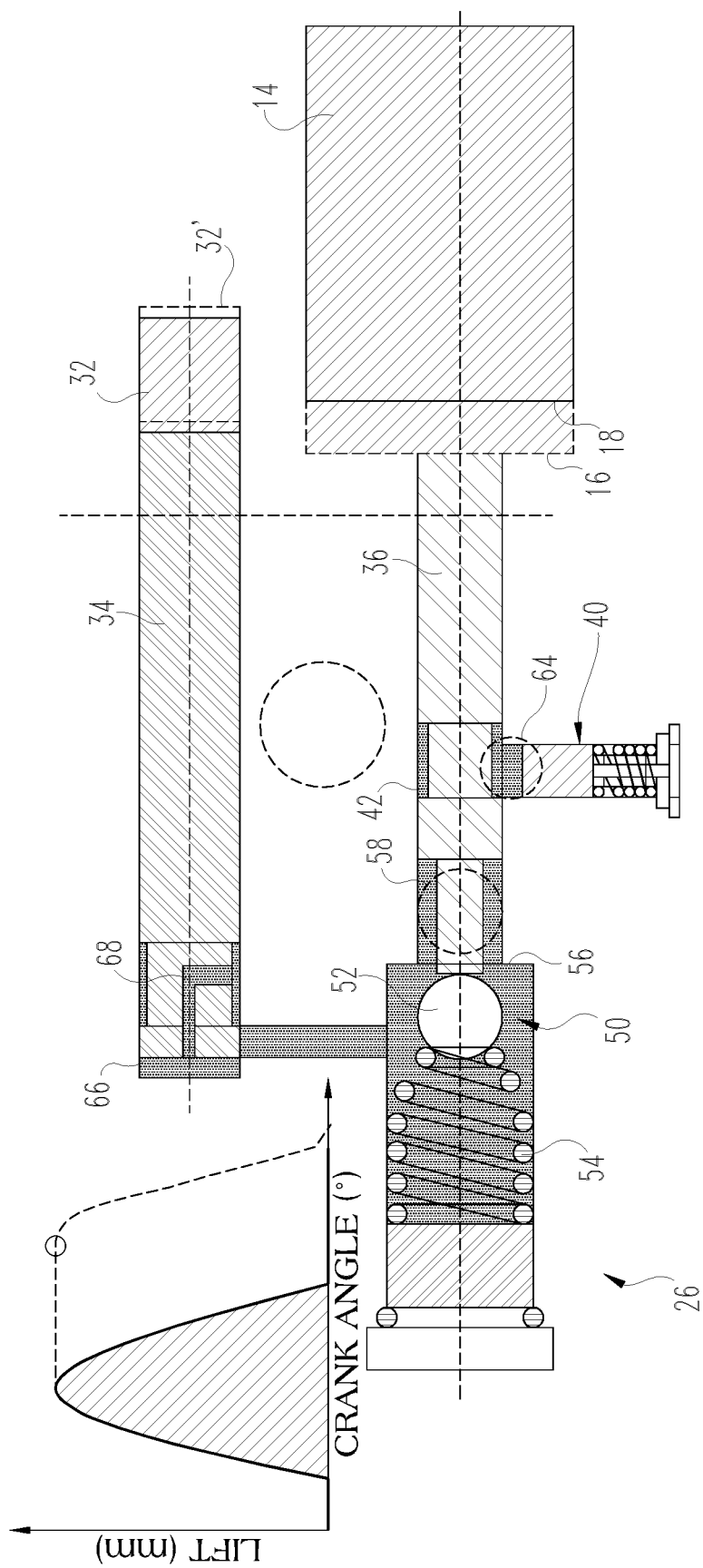

In FIG. 6D the ball 52 of valve assembly 50 is allowed to move due to the extension of reset pin 36 and seats against seat 56. This isolates the pressurized fluid in chamber 66 and locks holding member 34 in the extended position, therefore holding intake rocker 20 at the peak holding position 32'. As shown in FIG. 6E, the fluid is trapped in fluid cavity 60 and chamber 66 to prevent the holding member 34 from moving. In FIG. 6F, the cam shaft 12 has rotated so that cam lobe 16 is in contact with reset pin 36, which forces reset pin 36 into pedestal 24 and opens valve assembly 50 by unseating ball 52 from seat 56. This allows fluid to flow back into the hydraulic circuit from cavity 60 and chamber 66 through overhead fluid supply 58 and into a fluid accumulator. The holding member 34 therefore can retract into pedestal 24 in response to the intake valve spring force normally biasing the intake rocker 20 and intake valve to the closed position.

Figure 6G:
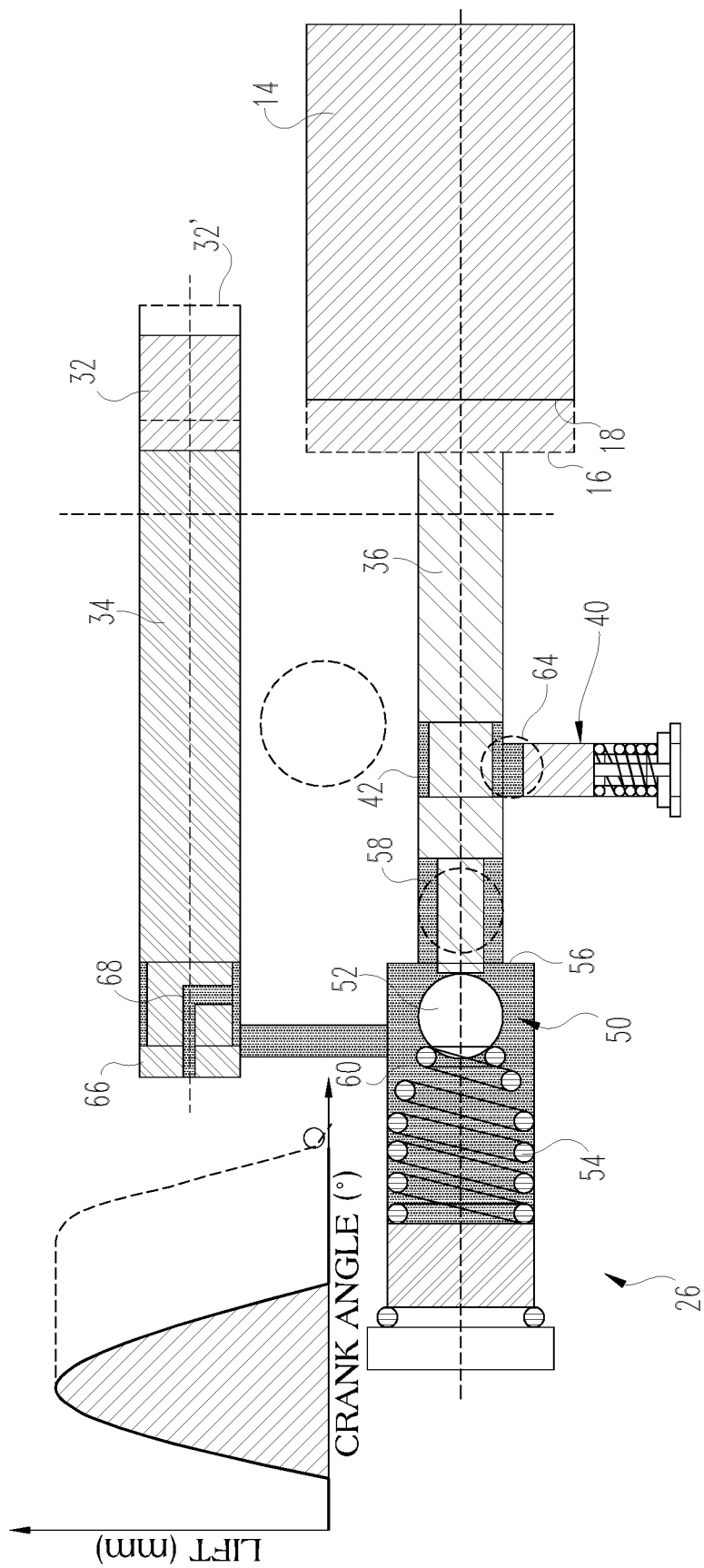
Figure 6H:
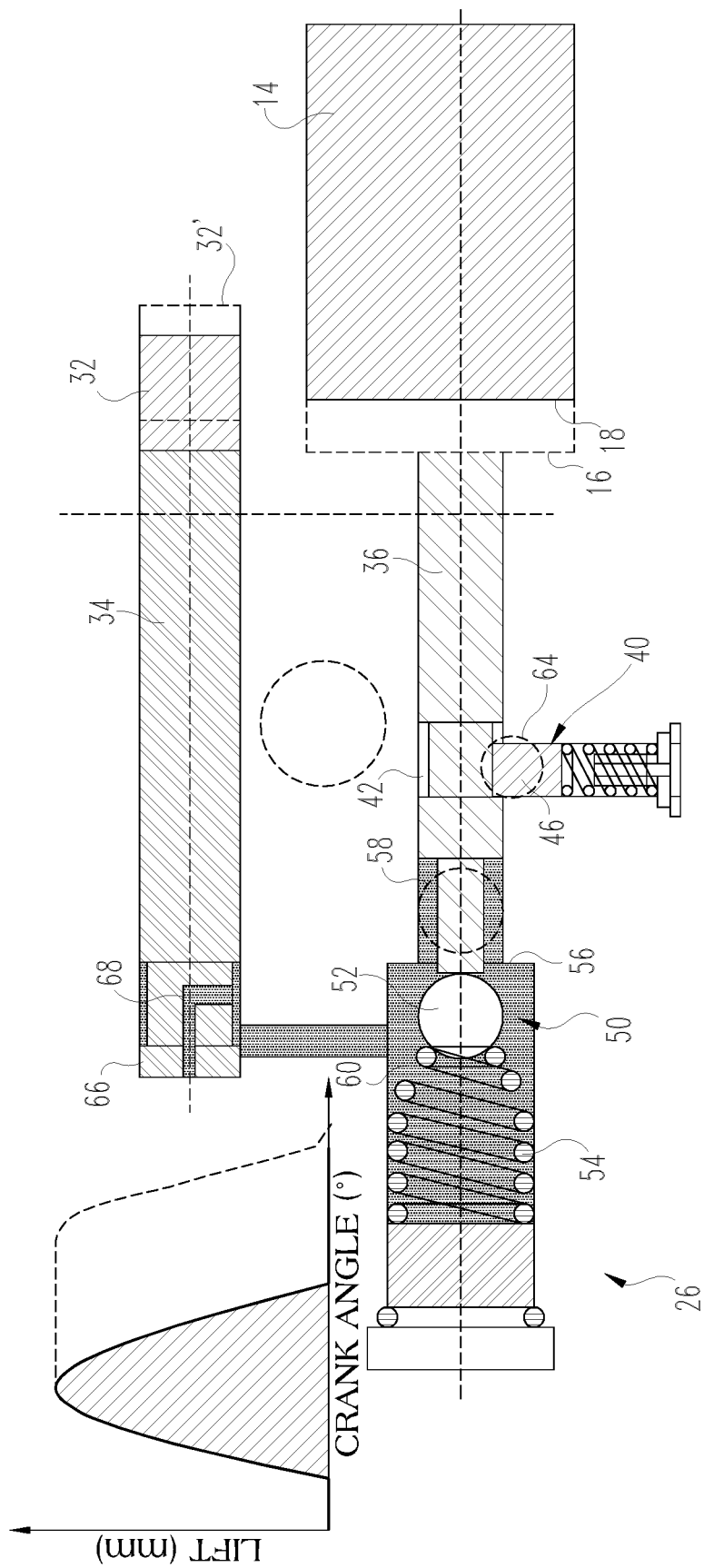

In FIG. 6G the fluid in chamber 66 has passed through a flow control orifice 68 of holding member 36 and into cavity 60 to allow retraction of the holding member 34. This allows the closing force of the intake valve to be controlled from its peak lift position. In addition, reset pin 36 has retracted sufficiently into pedestal 24 to align actuating member 40 with groove 42. As shown in FIG. 6H, solenoid 28 is de-energized and the actuator piston 46 re-engages the reset pin 36 in groove 42 to lock it in the retracted position. In this position the reset pin 36 also holds ball 52 off of seat 56 to prevent high pressure from building in cavity 60 and chamber 66, allowing fluid flow to and from the cavity 60 as holding member 34 follows the intake rocker 20.

In FIGS. 7A-7H, another embodiment of the hydraulic circuit is shown that is similar to FIGS. 6A-6H and designated at 126. Hydraulic circuit 126 provides an overhead fluid supply is controlled through a modified actuating member 140. Corresponding elements are therefore labelled with the same reference numerals as FIGS. 6A-6H.

Figure 7B:
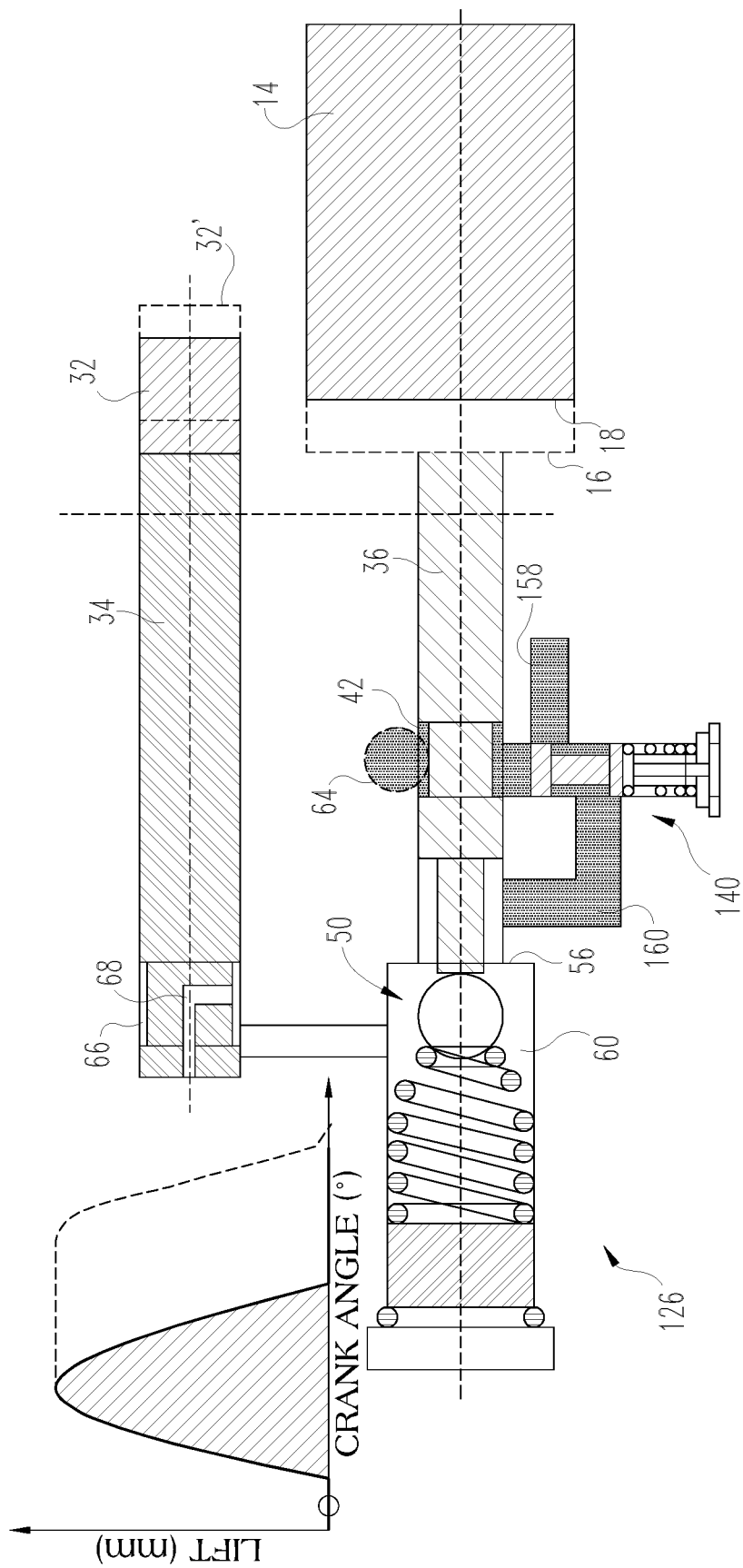

When the hydraulic circuit 126 is inactive as shown in FIG. 7A, there is no oil pressure in cavity 60 or chamber 66. This allows holding member 34 to stay retracted and not follow extending lever extension 32 during normal operation. Actuating piston 146 of actuating member 140 blocks the overhead oil supply 158 from supplying pressurized fluid into cavity 60 through passage 160. In FIG. 7B, the solenoid 28 is energized and control fluid is suppled to groove 42 via control fluid supply 64. This displaces actuating member 146 out of groove 42, while simultaneously opening passage 160 to receive pressurized fluid from overhead fluid supply 158.

Figure 7C:
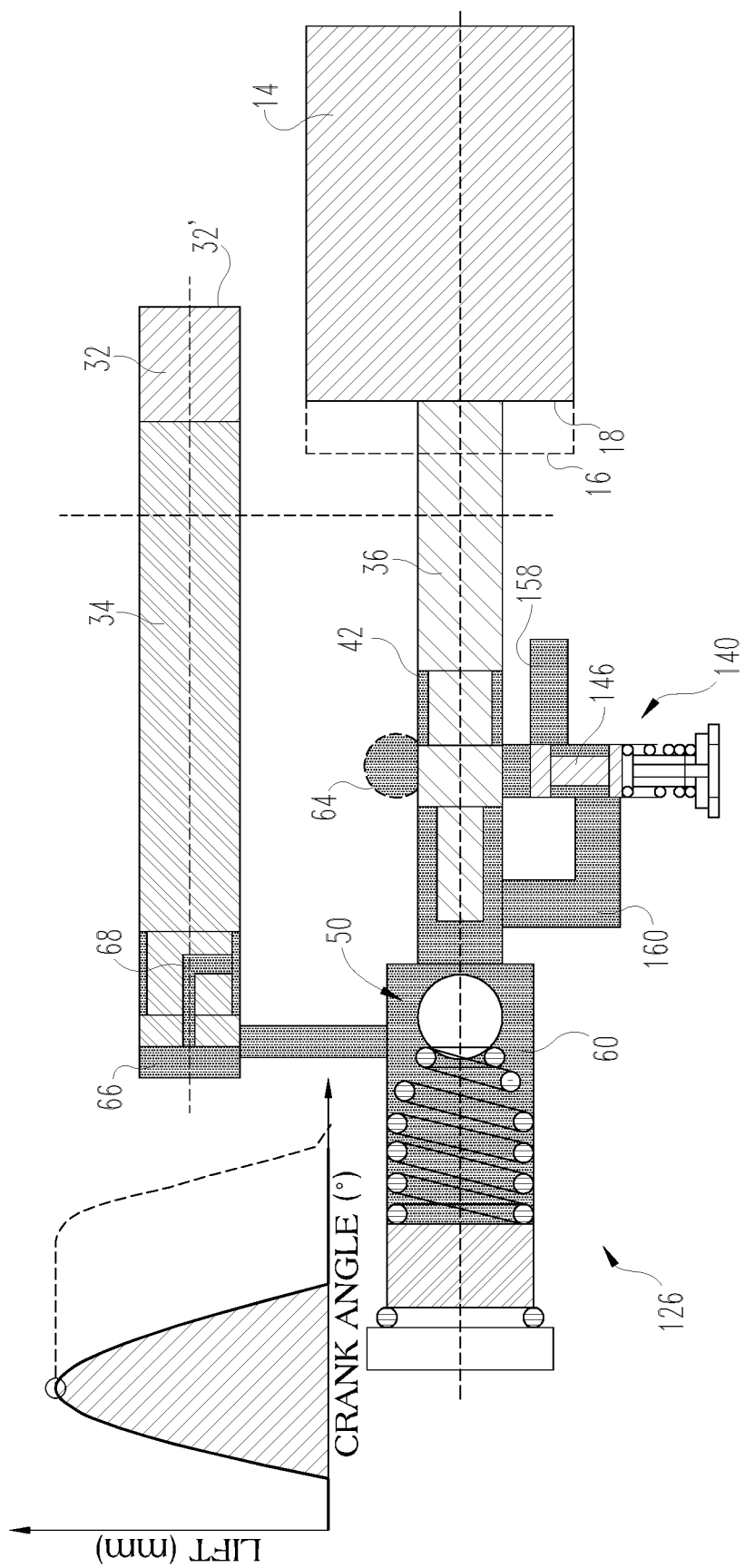
Figure 7D:
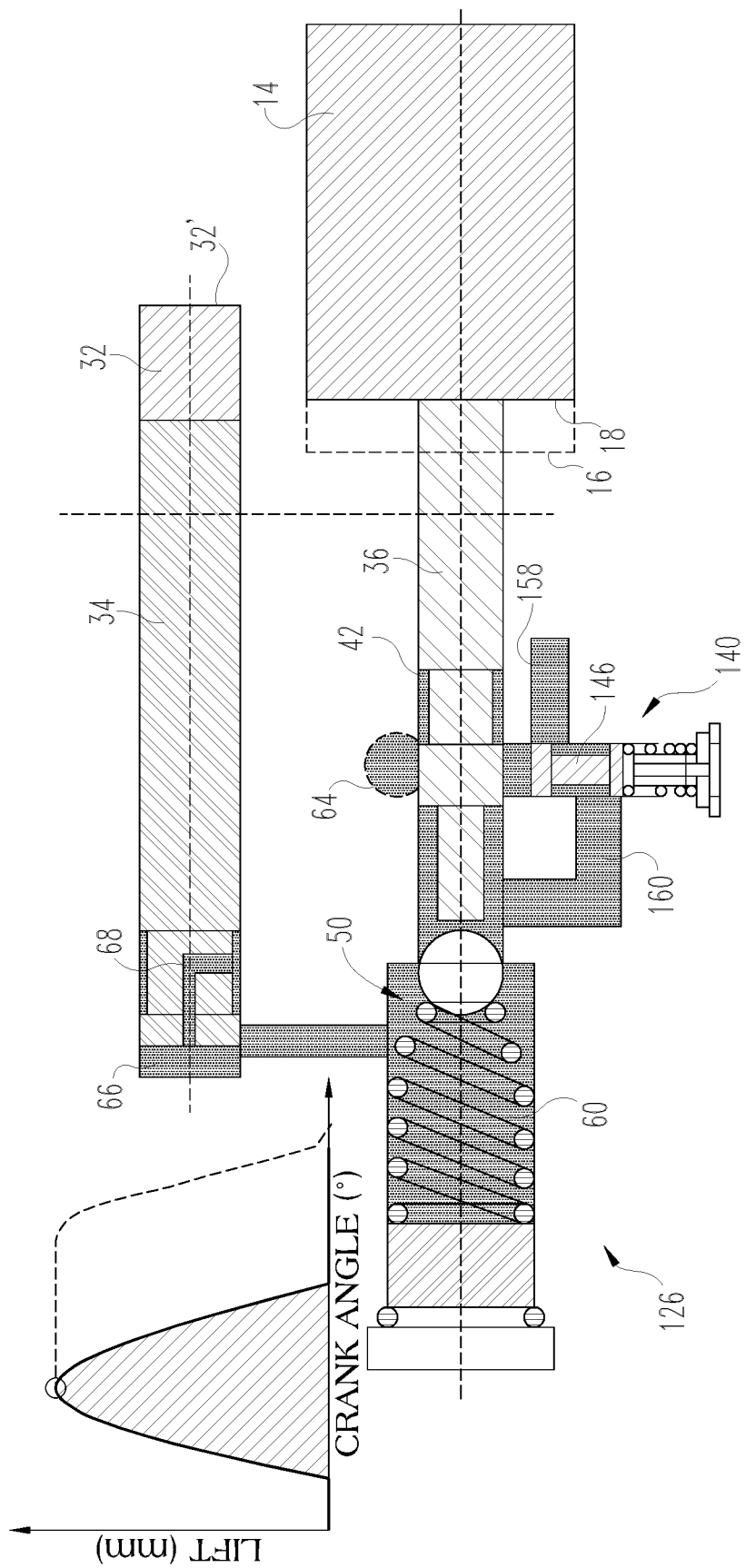
Figure 7E:
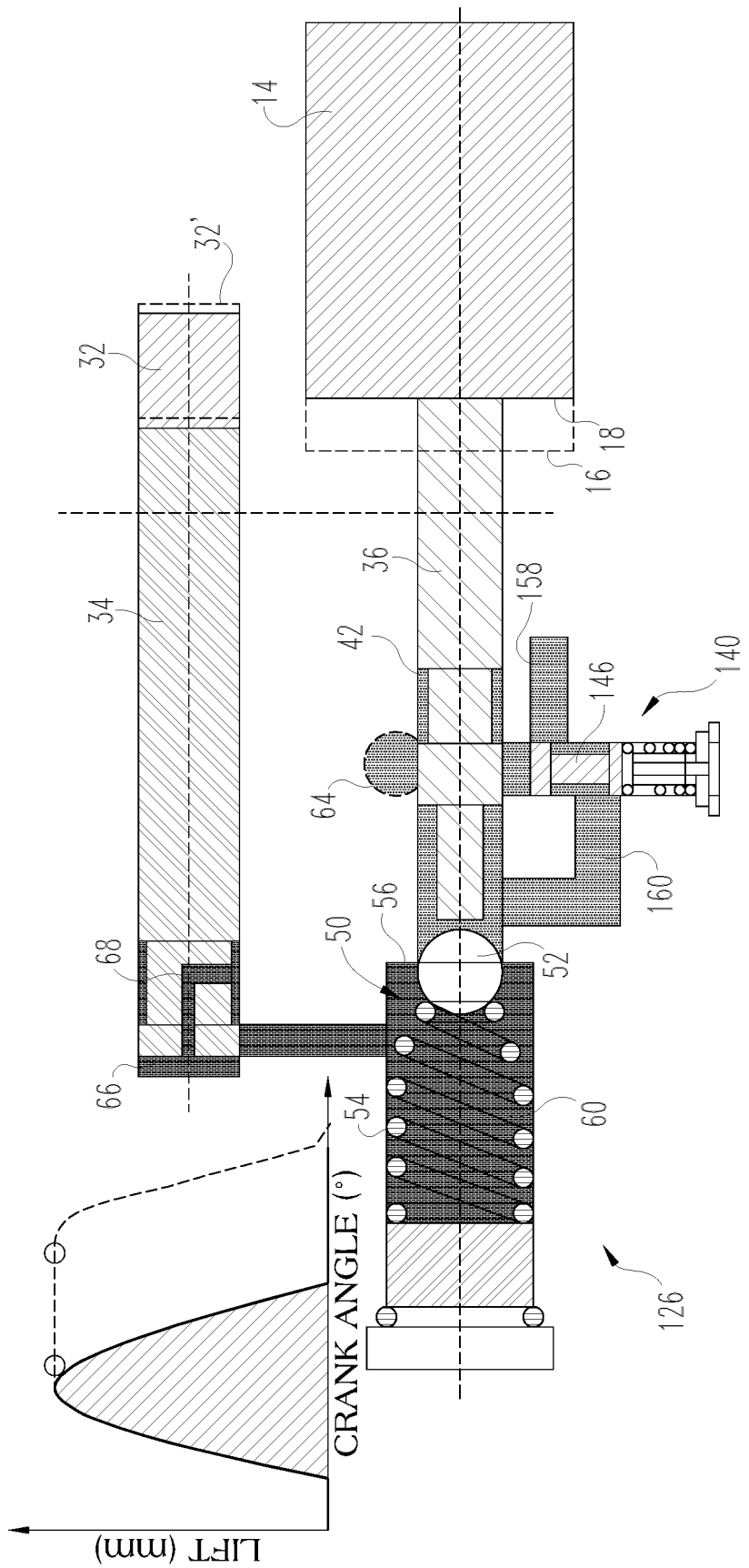

As shown in FIG. 7C the pressurized fluid is provided to cavity 60 behind reset pin 36 to force it out of pedestal 24 and into contact with base circle 18 of cam 14. The pressurized fluid is also provided to chamber 66 to force holding member 34 out of pedestal 24 and into contact with the lever extension 32 in the peak lift position 32'. In FIG. 7D the valve assembly 50 closes to trap the fluid in cavity 60 and chamber 66, as shown in FIG. 7E, to lock holding member 34 in the extended position.

Figure 7F:
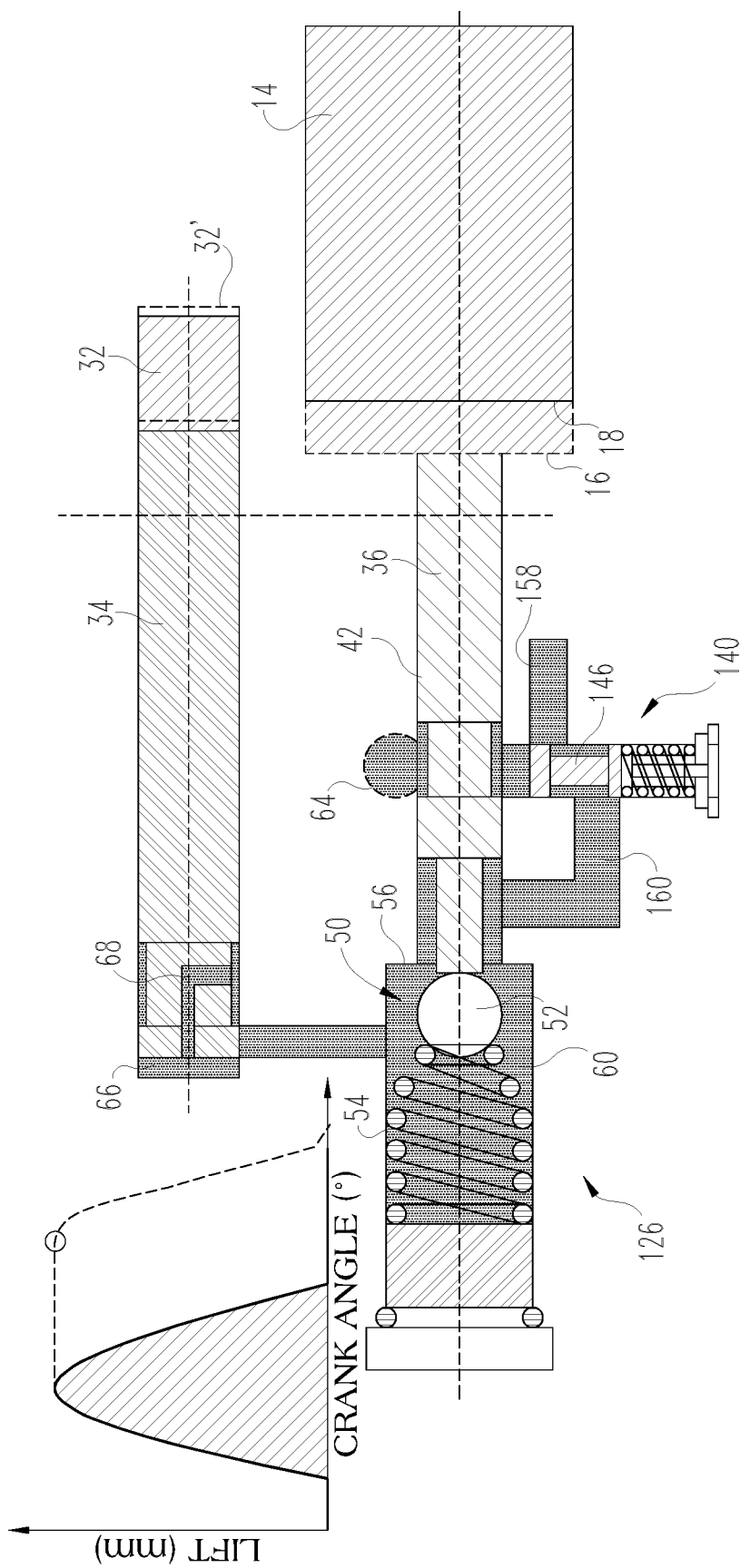
Figure 7G:
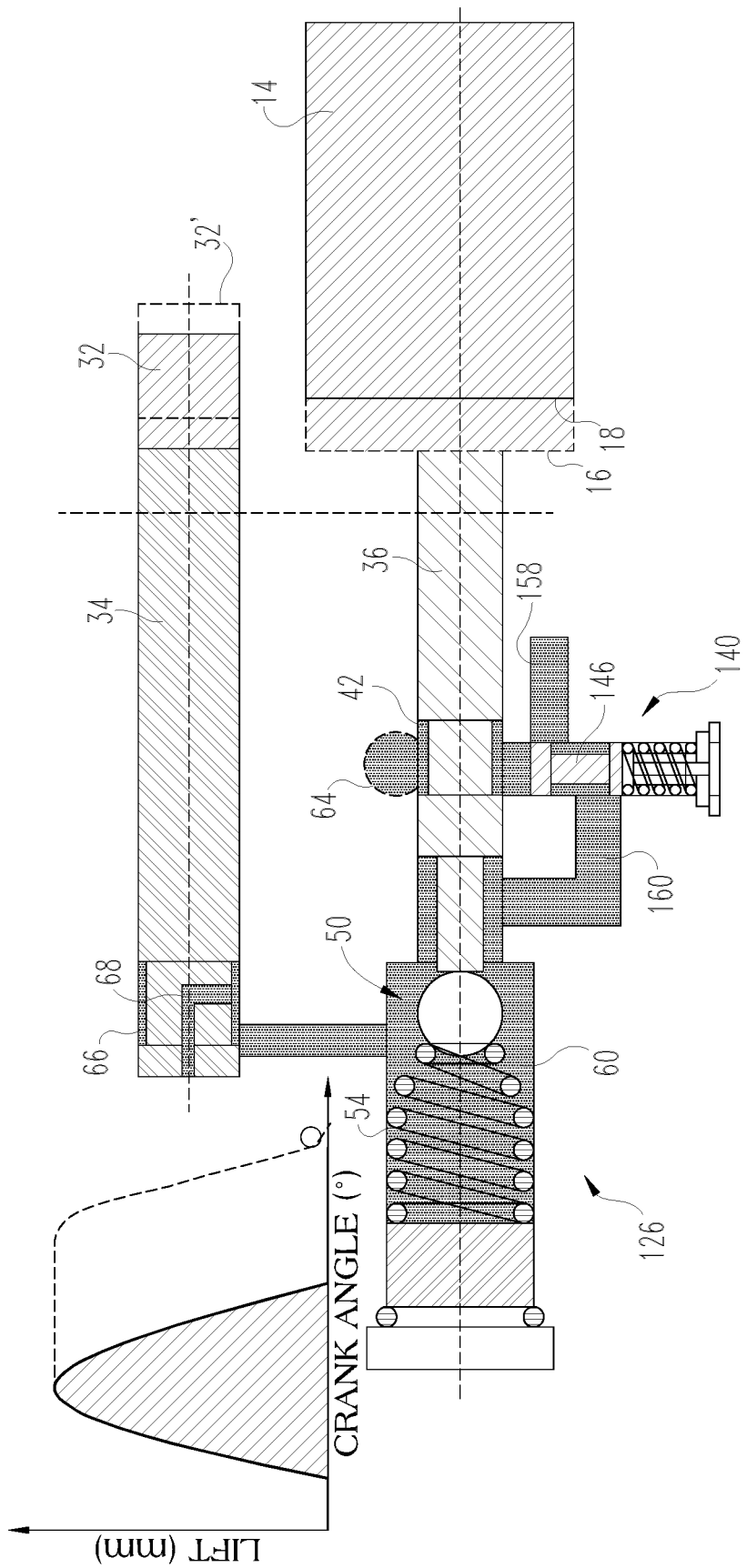
Figure 7H:
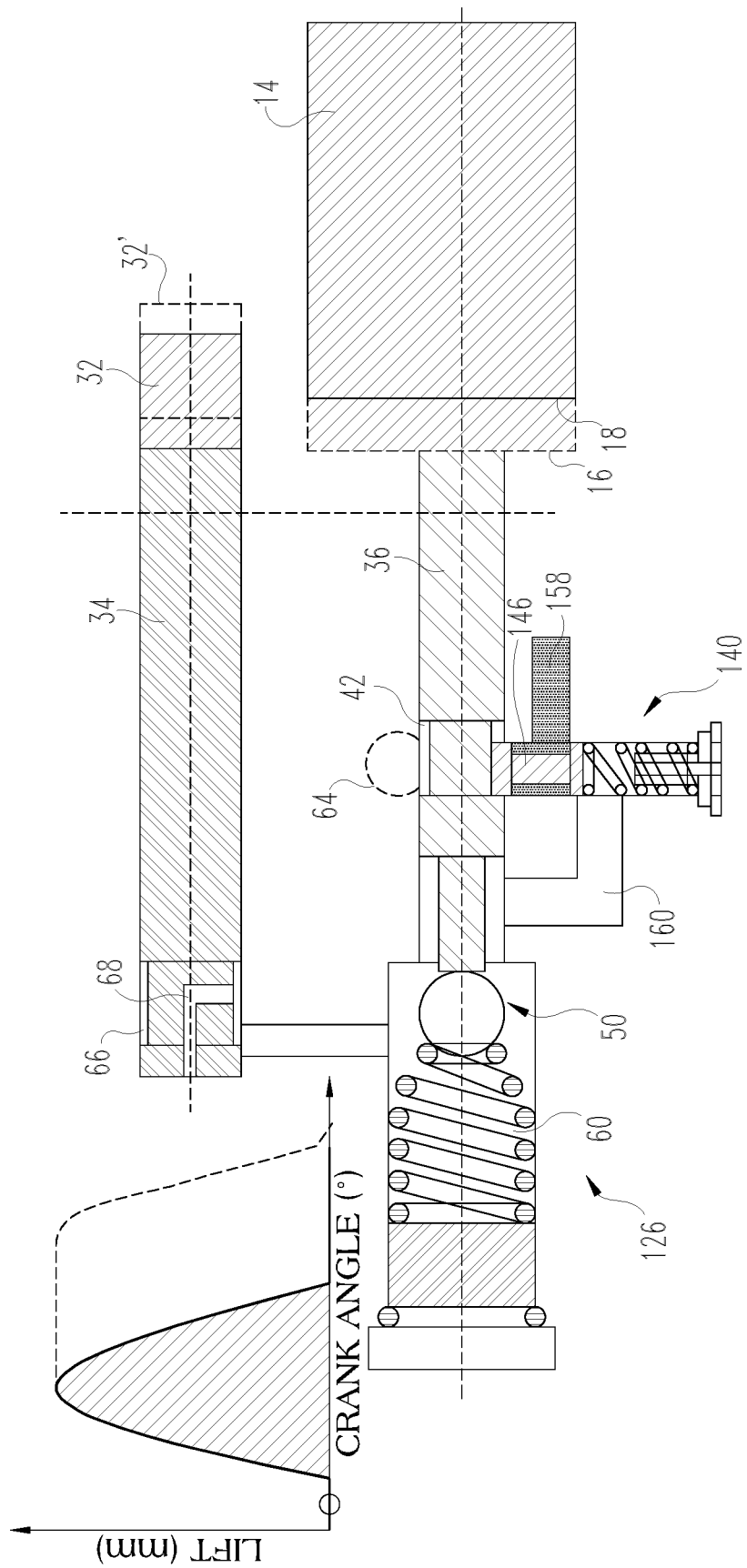

As shown in FIG. 7F, the cam lobe 16 contacts the reset pin 36 to force it back into pedestal 24, which in turn opens the valve assembly 50 and allows the fluid to flow back into overhead fluid supply 158 from cavity 60 and chamber 66 through the passage 160, allowing the holding member 34 to retract as shown in FIG. 7G. The flow control orifice 68 catches the retracting holding member 34 to slow its retraction. In FIG. 7H the fluid pressure has drained from chamber 66 and cavity 60, and the solenoid 28 is de-energized. This allows actuating piston 146 to re-engage reset pin 36 in groove 42 to lock it in a retracted position in pedestal 24. In addition, the reset pin holds the valve assembly 50 in an open position during standard Miller cycle operation.

FIGS. 8A-8K show another embodiment hydraulic circuit 226. Hydraulic circuit 226 operates similar to hydraulic circuits 26, 126, and like elements are designated with like reference numerals. In addition, hydraulic circuit 226 includes a modified holding member 34' and modified reset pin 36' that are configured to be spring biased to a retracted position with return springs 234, 236, respectively. The return springs 234, 236 can be positioned around stems 238, 240 of holding member 34' and reset pin 36' respectively. In addition, return springs 234, 236 can be positioned against a support 242 such as a spring plate or snap ring that is engaged to pedestal 24. The return springs 234, 236 maintain the holding member 34' and reset pin 36' out of contact with the lever extension 32 and cam lobe 16, respectively, until actuated with fluid pressure. It should be understood, however, the return springs 234, 236 are optional and FIGS. 8A-8K may utilize holding member 34 and reset pin 36 as describe above.

Figure 8A:
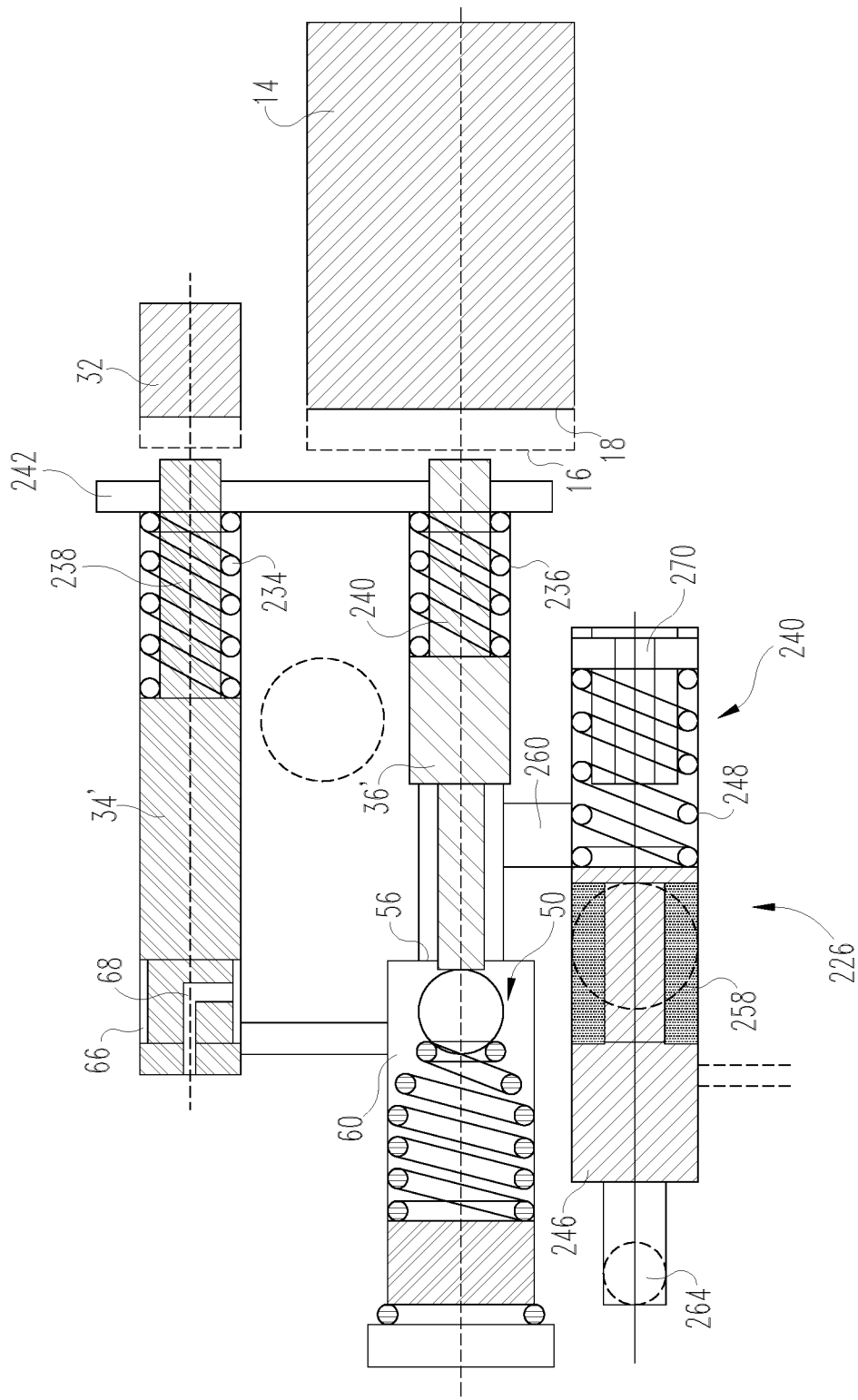
FIGS. 8A-8K show another embodiment of a hydraulic circuit for operating the variable valve timing system of FIGS. 1-5F with diagrams showing various crank angle conditions.
Figure 8B:
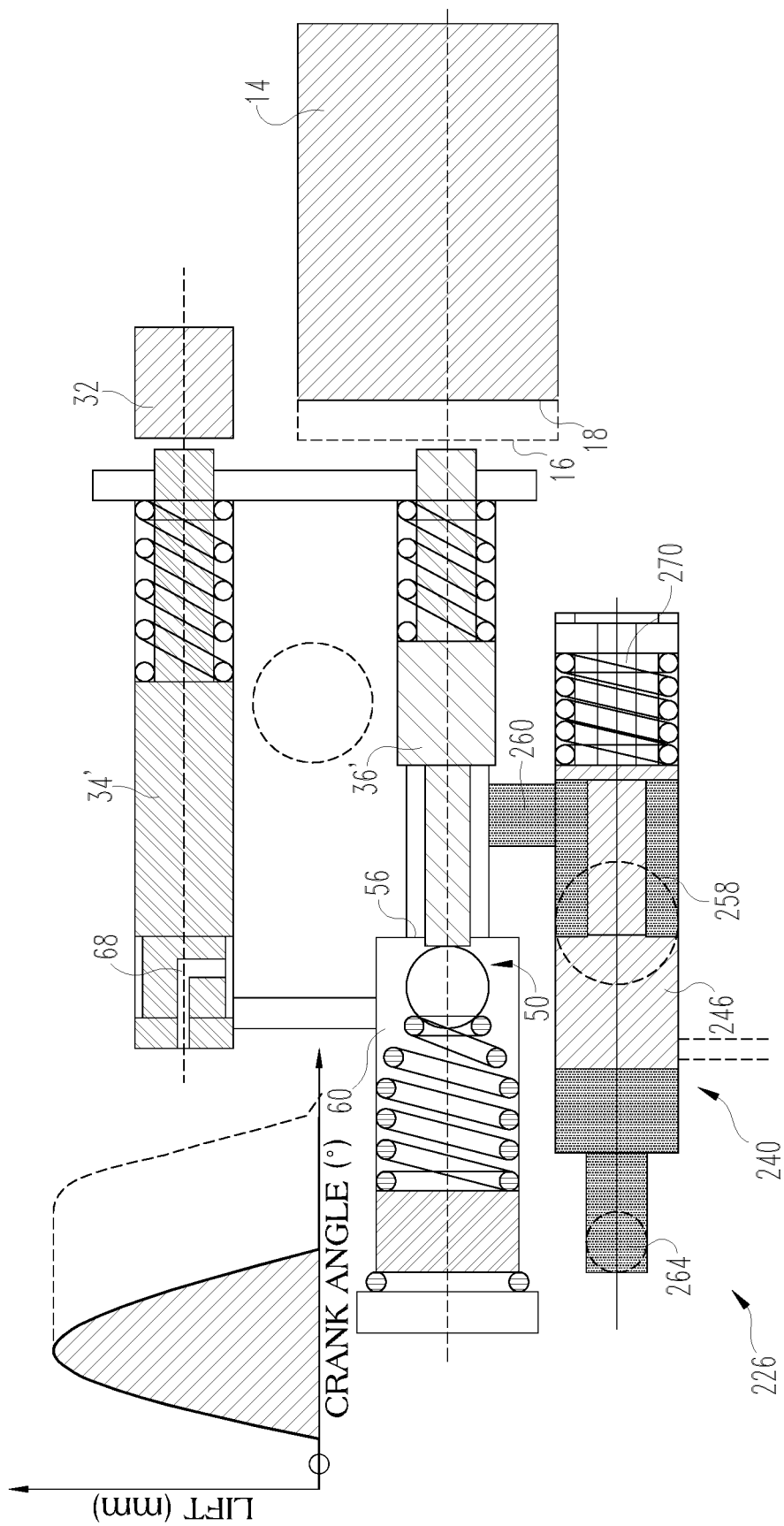
Figure 8C:
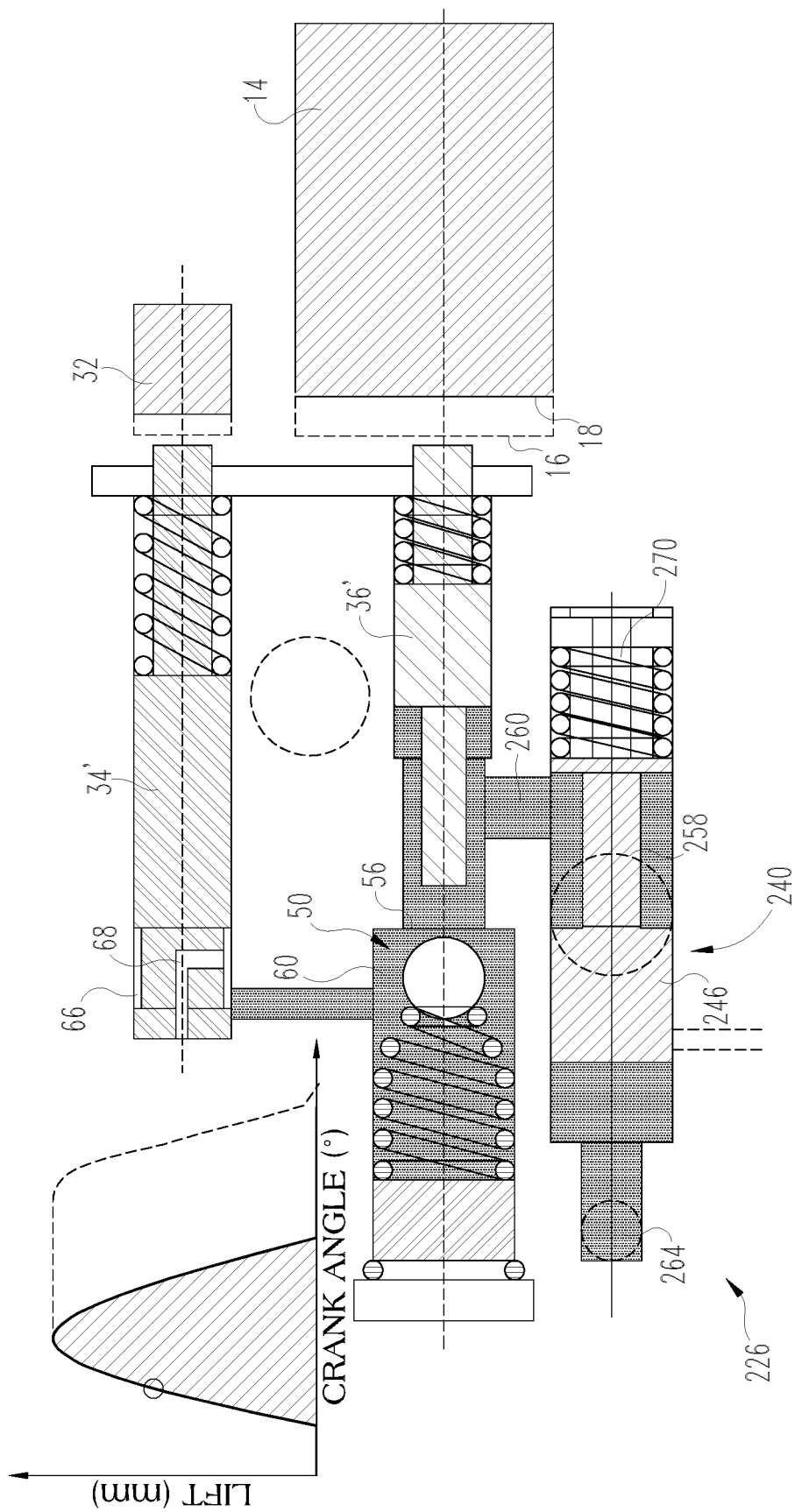
Figure 8D:
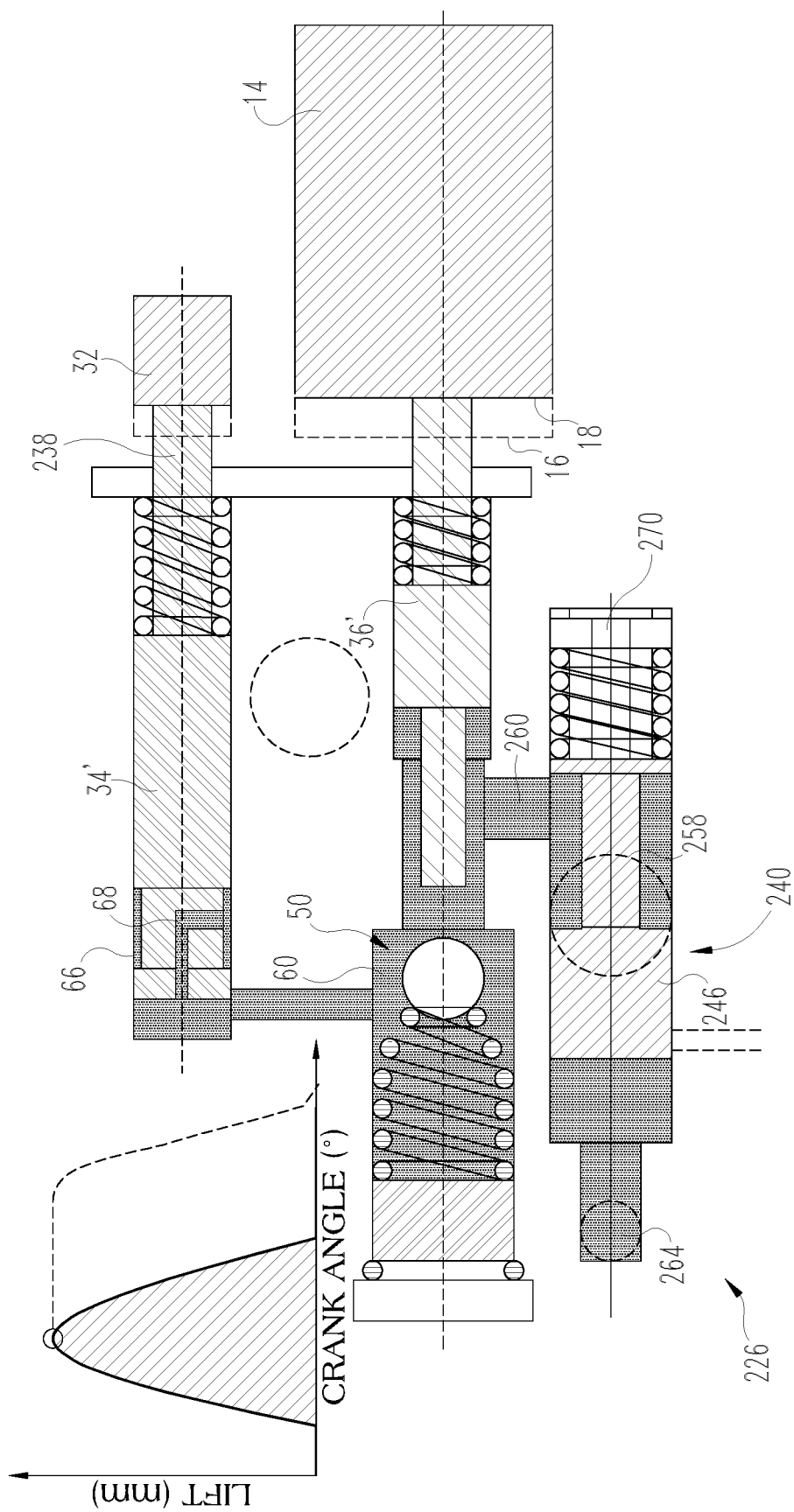

FIGS. 8A-8K also employ another embodiment actuating member 240 with an actuating piston 246 that does not directly contact the reset pin 36'. As shown in FIG. 8B actuating piston 246 is displaced with control fluid pressurized in control fluid supply 264 to compress the spring 248 and open overhead fluid supply 258 to passage 260 and isolate the vent 270 through the vent plug of the actuating member around which spring 248 is positioned. This unlocks the reset pin 36' and allows high pressure fluid to fill cavity 60 behind reset pin 36', as shown in FIG. 8C. Fluid continues to flow to pressurize chamber 66 around holding member 34' as shown in FIG. 8D. This forces the holding member 34' outwardly to contact the lever extension 32 of the intake rocker 20.

Figure 8E:
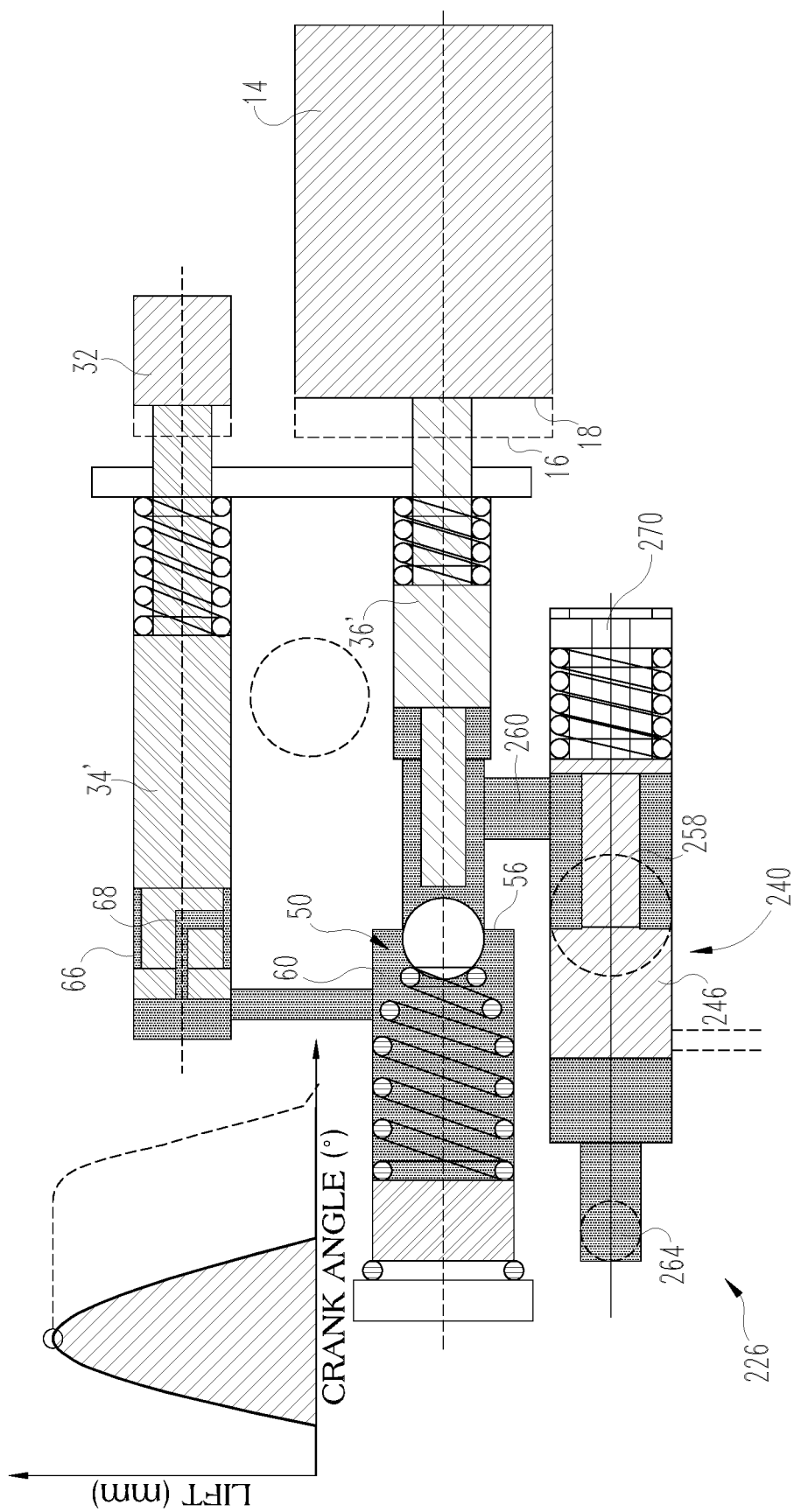
Figure 8F:
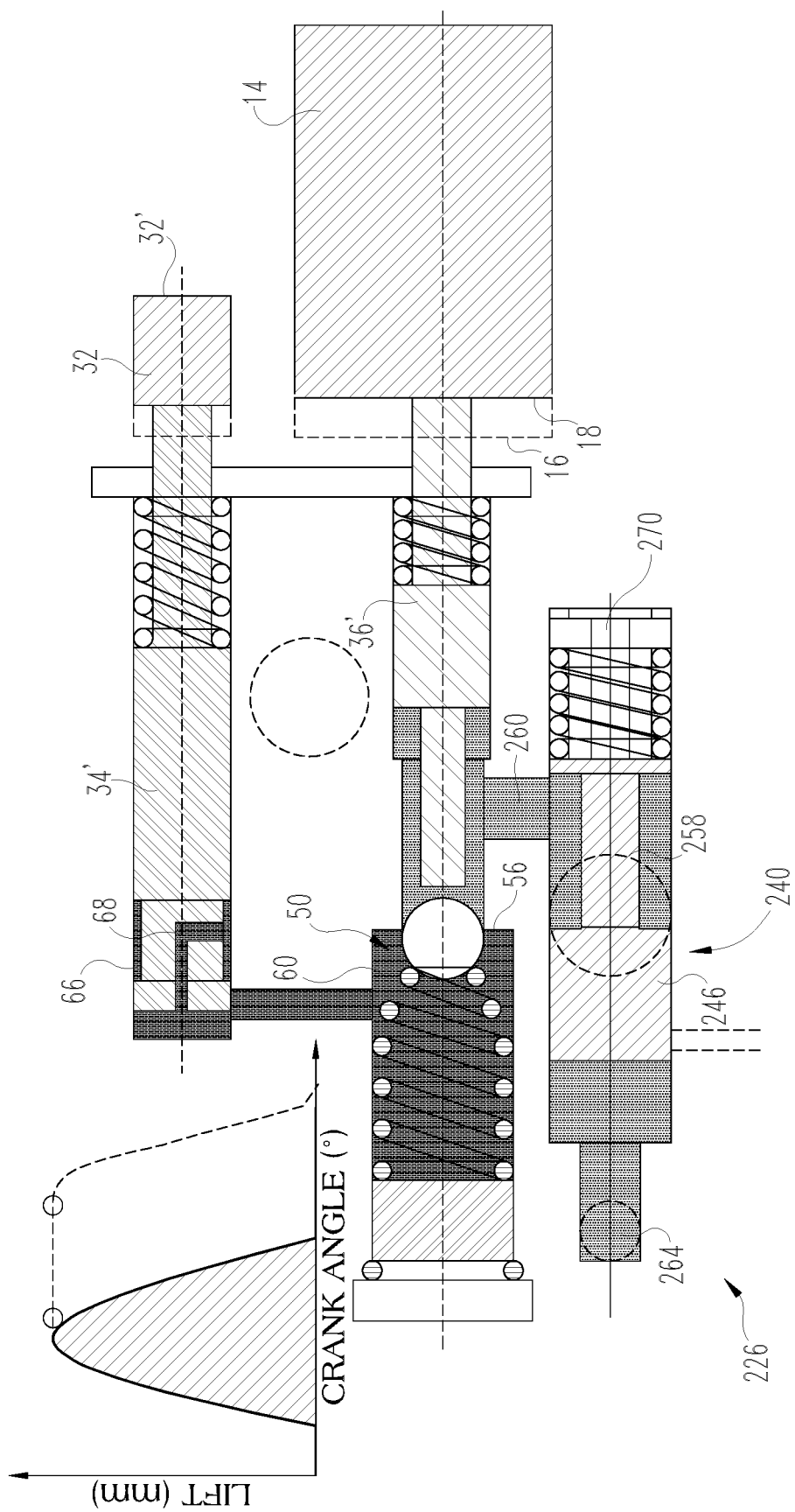

Displacement of the reset pin 36' to extend outwardly from the pedestal 24 to contact base circle 18 of the cam 14 also allows valve assembly 50 to close on seat 56, as shown in FIG. 8E. This traps the fluid in cavity 60 and chamber 66 and locks holding member 34' into position against the lever extension 32 at its peak lift position 32', as shown in FIG. 8F.

Figure 8G:
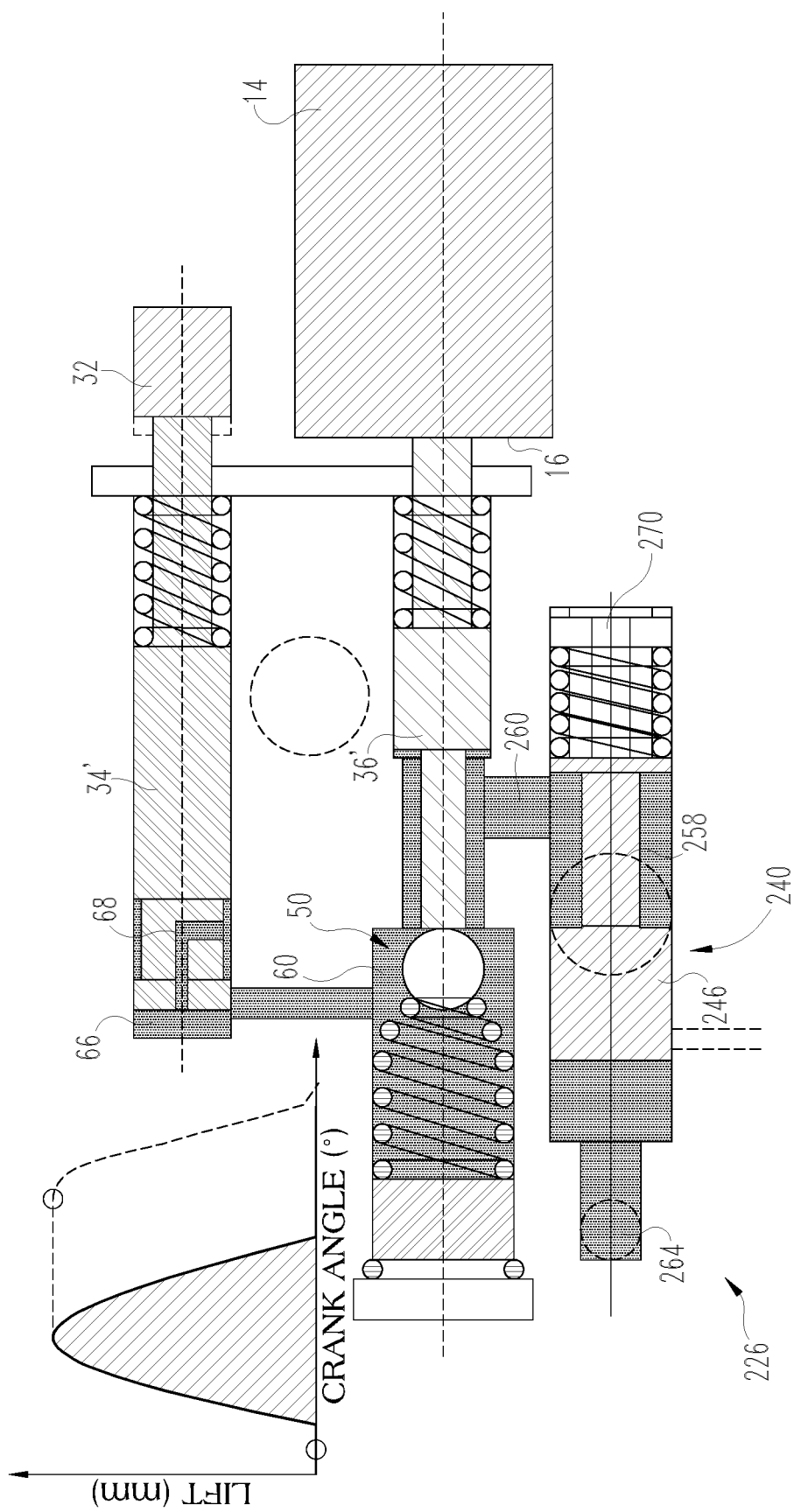
Figure 8H:
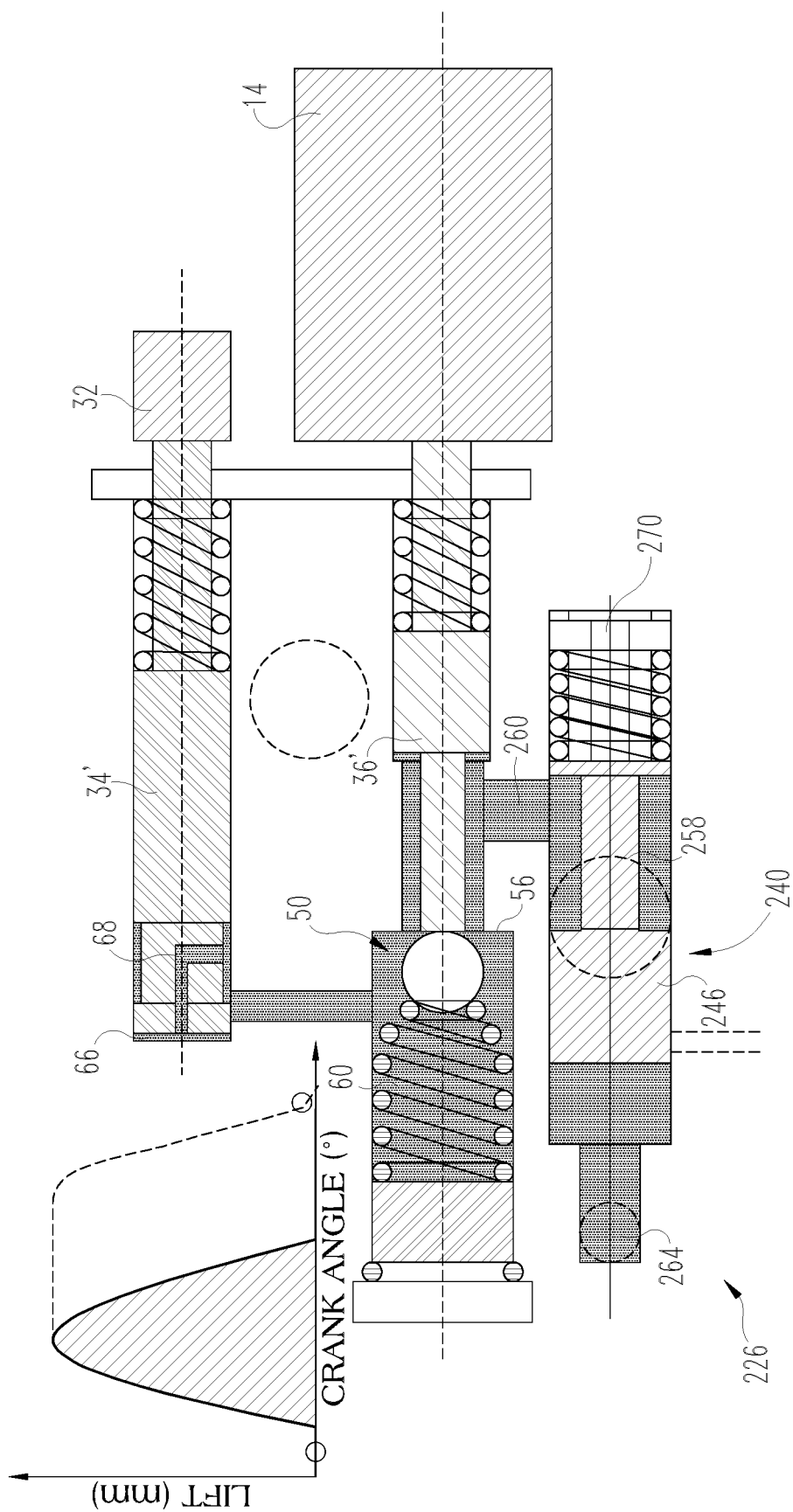
Figure 8I:
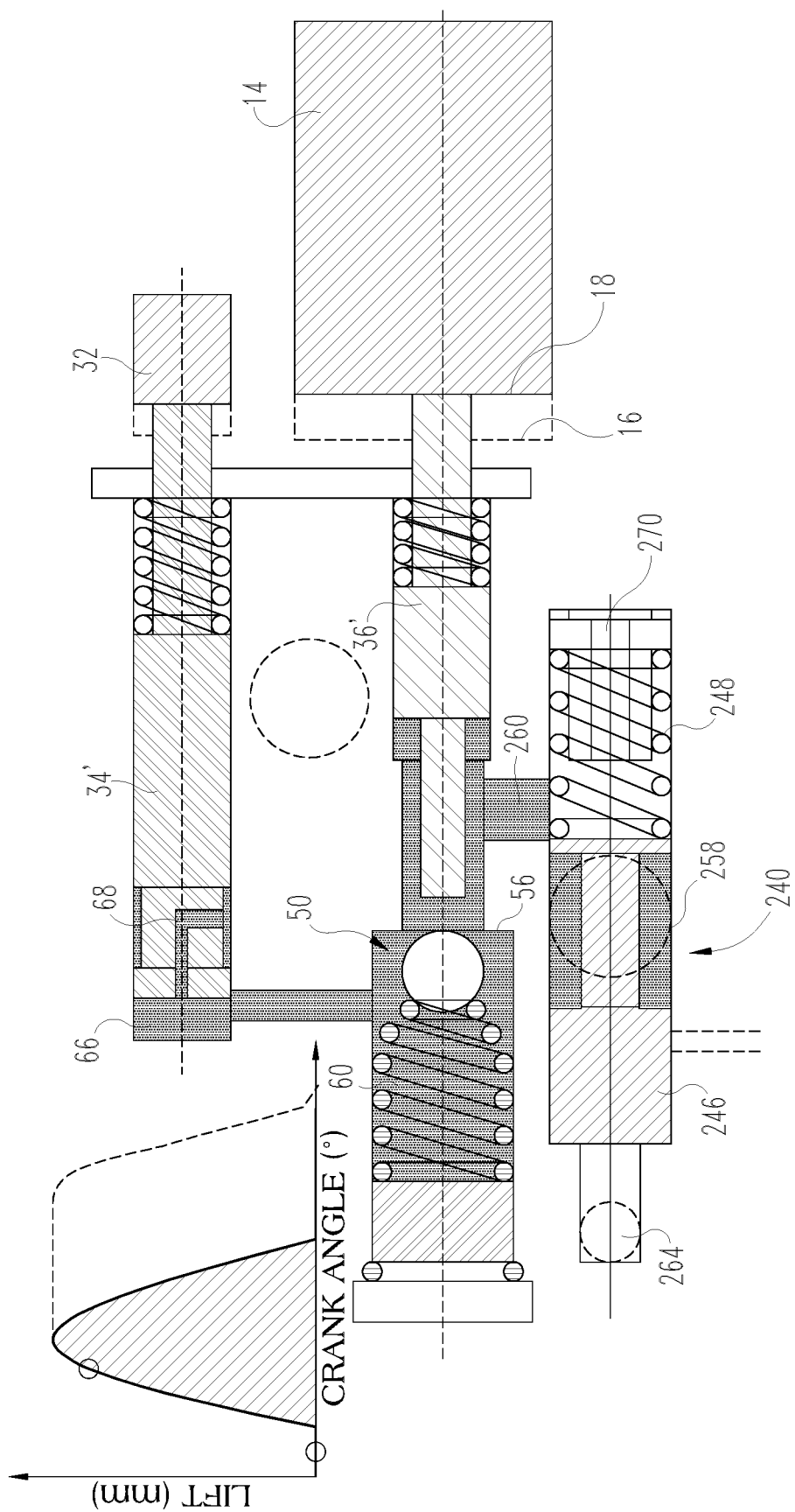
Figure 8J:
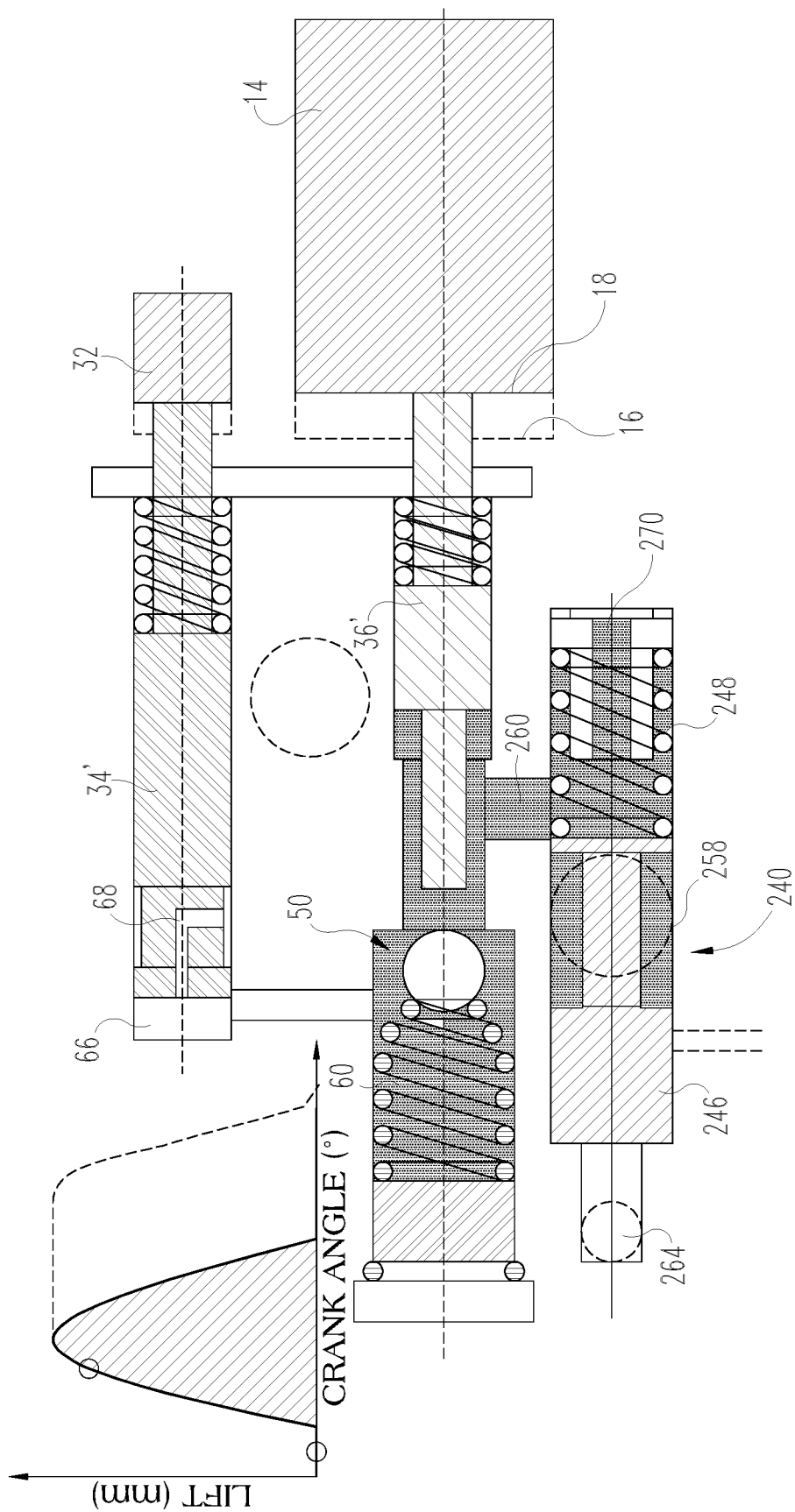
Figure 8K:
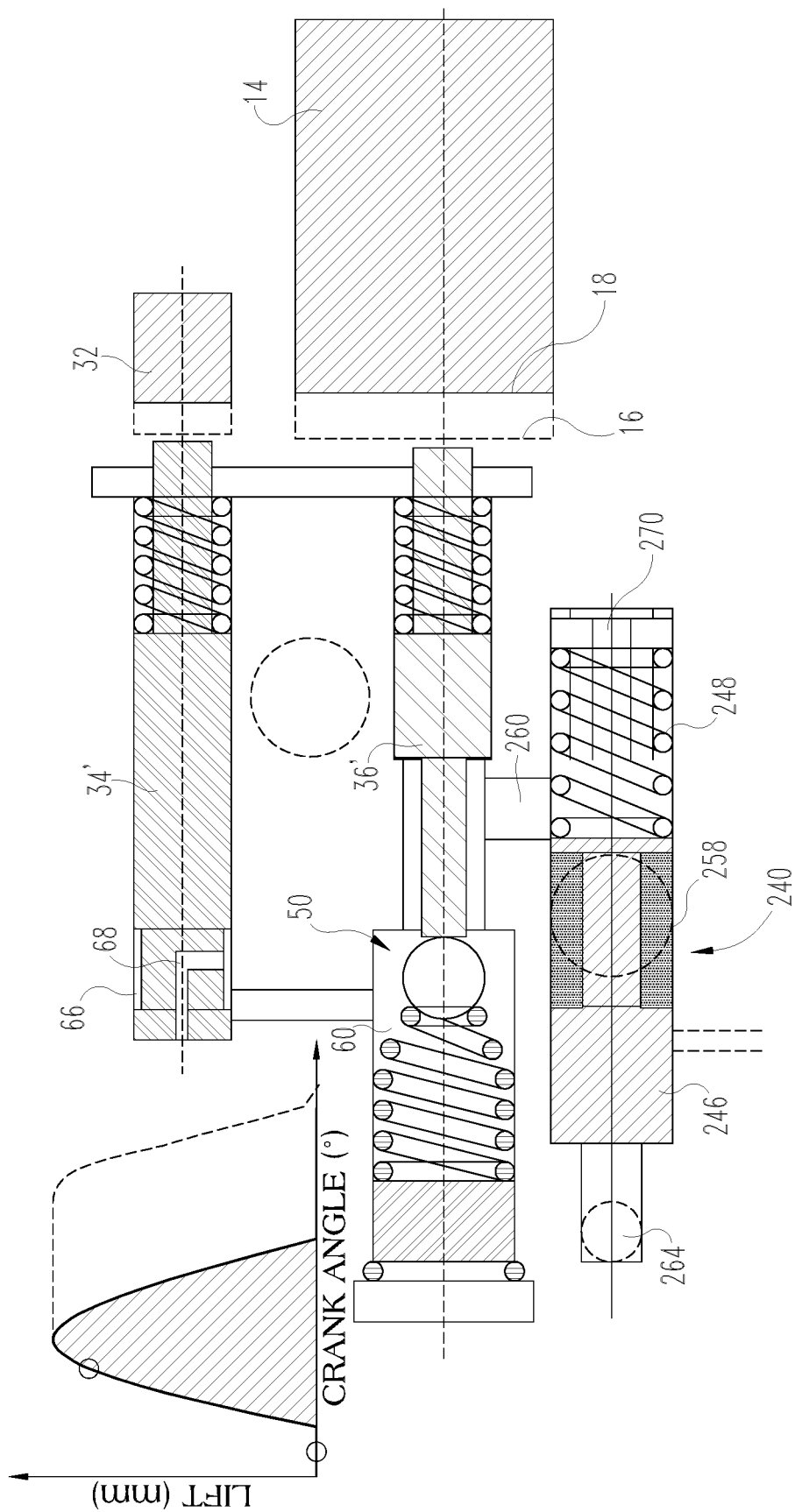

As shown in FIG. 8G, the cam lobe 16 contacts the reset pin 36' to force it back into pedestal 24, which in turn opens the valve assembly 50 and allows the fluid to flow back into overhead fluid supply 258 from cavity 60 and chamber 66 through the passage 260 as shown in FIG. 8H. The flow control orifice 68 catches the retracting holding member 34' to slow its retraction. In FIG. 8I the solenoid 28 is de-energized and the fluid pressure has drained from behind actuator piston 246, allowing the spring 248 to displace the actuator piston back to close the overhead fluid supply 258. In FIG. 8J, the fluid drains from cavity 60 and chamber 66 through a vent 270 of actuating member 240. This allows the holding member 34' and reset pin 36' to retract into pedestal 24, as shown in FIG. 8K.

Figure 9A:
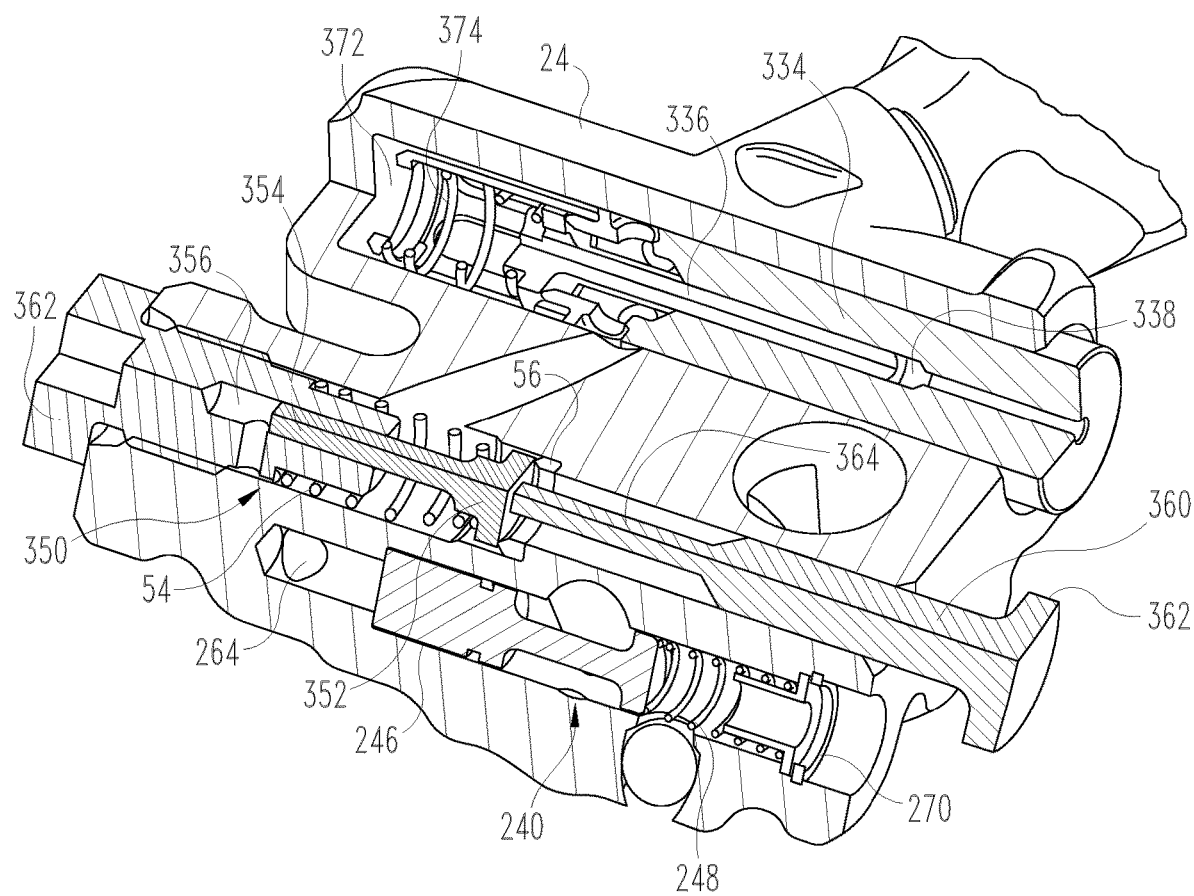
FIGS. 9A-9O show another embodiment of a hydraulic circuit for operating the variable valve timing system of FIGS. 1-5F with diagrams showing various crank angle conditions.

In FIGS. 9A-9O, another embodiment of the hydraulic circuit 326 is shown that is similar to hydraulic circuit 226 of FIGS. 8A-8K. Elements in FIGS. 9A-9O that are like the embodiment of FIGS. 8A-8K are designated with the same reference numerals. As shown in FIGS. 9A and 9B, hydraulic circuit 326 includes a valve assembly 350 that includes a disc 352 that is engageable against seat 56 rather than a ball 52 to act as a check valve. A stem 354 extends from the disc 352 and is slidingly received in a bore 356 of plug 362. Spring 54 is positioned around stem 354 in contact with plug 362 and disc 352.

In addition, a holding member 334 is provided that differs in structure and operation from holding member 34' but performs a similar function. Holding member 334 includes a second check valve 336 that is received in a passage 338 of holding member 334. Holding member 334 includes a head 340 that defines an outer chamber 342, bores 344, and an inner chamber 346 that is in flow communication with outer chamber 342 through bores 344. Second check valve 336 includes an end member 348 with a flow control orifice 370 extending from inner chamber 346 to a cavity 372 in pedestal 24 that houses holding member 334. A spring 374 in cavity 372 biases the second check valve 336 into passage 338.

Further, a reset pin 360 is provided that differs from reset pin 36'. Reset pin 360 is not spring biased, but includes a foot 362 outside of pedestal 24 that is normally in contact with and follows the profile of the cam 14. Reset pin 360 also includes a stem 364 that moves with the reset pin 360 via cam lobe 16 to contact disc 352 of valve assembly 350 to open the valve assembly 350.

Figure 9C:
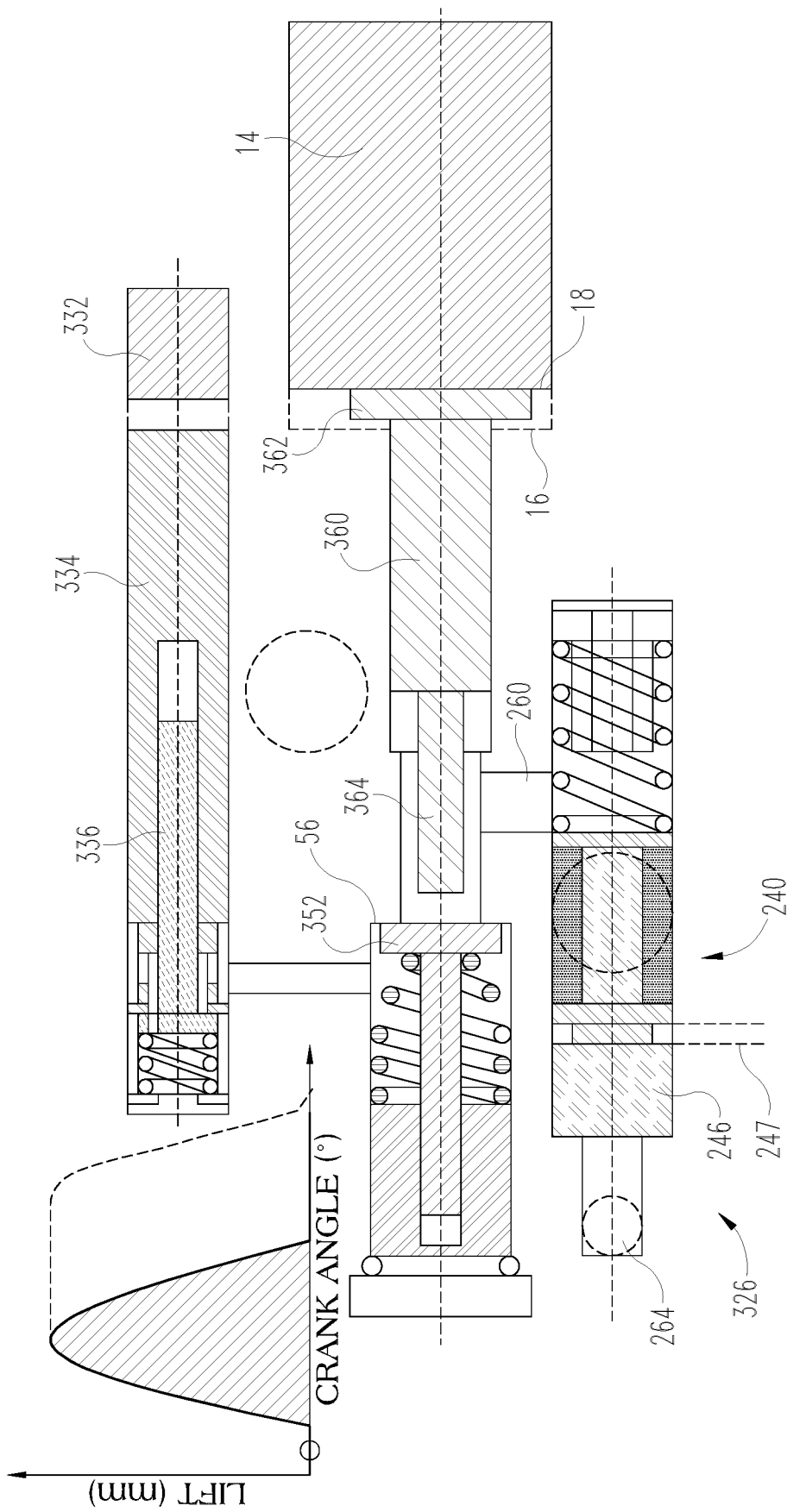
Figure 9D:
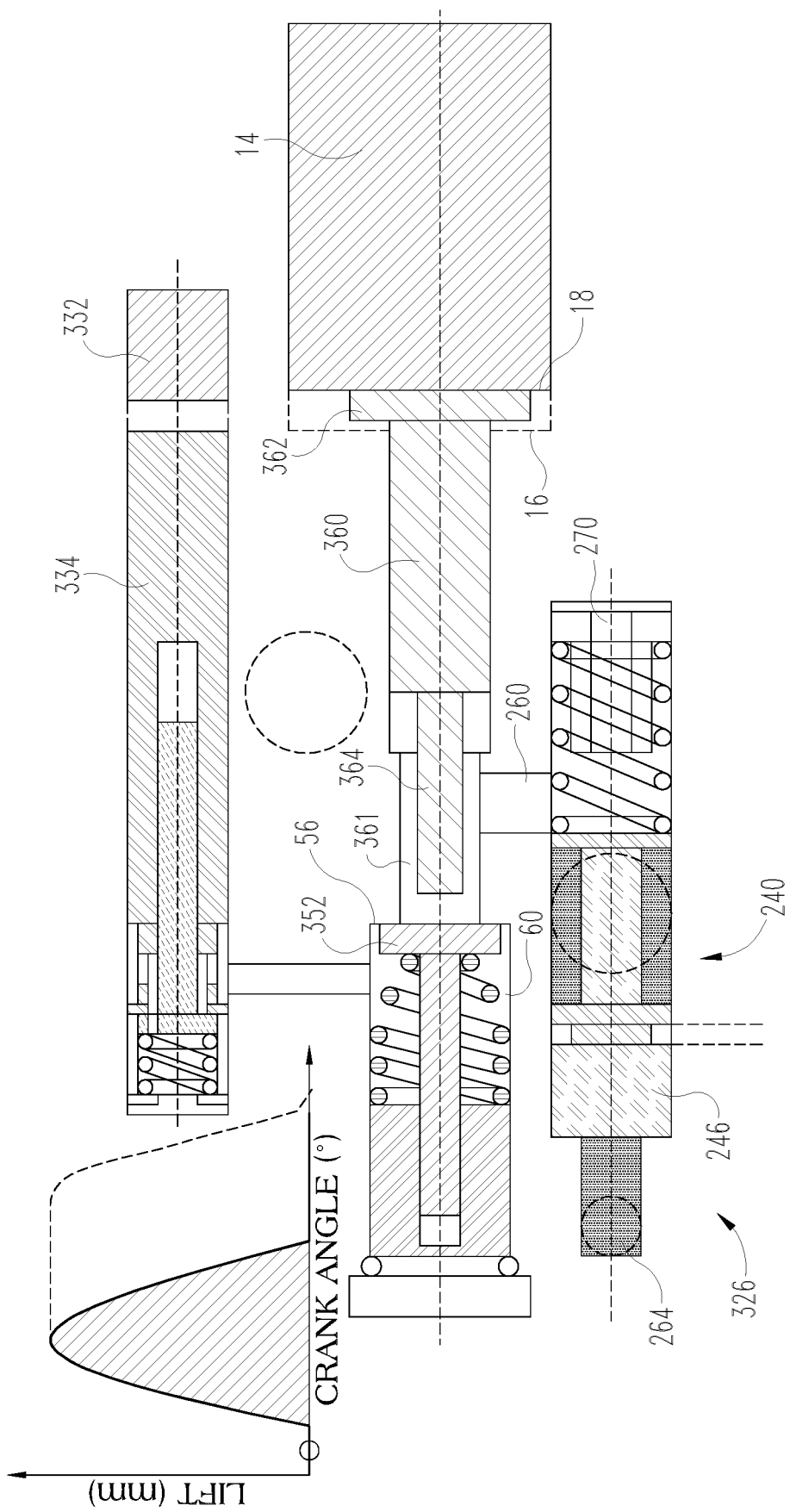
Figure 9E:
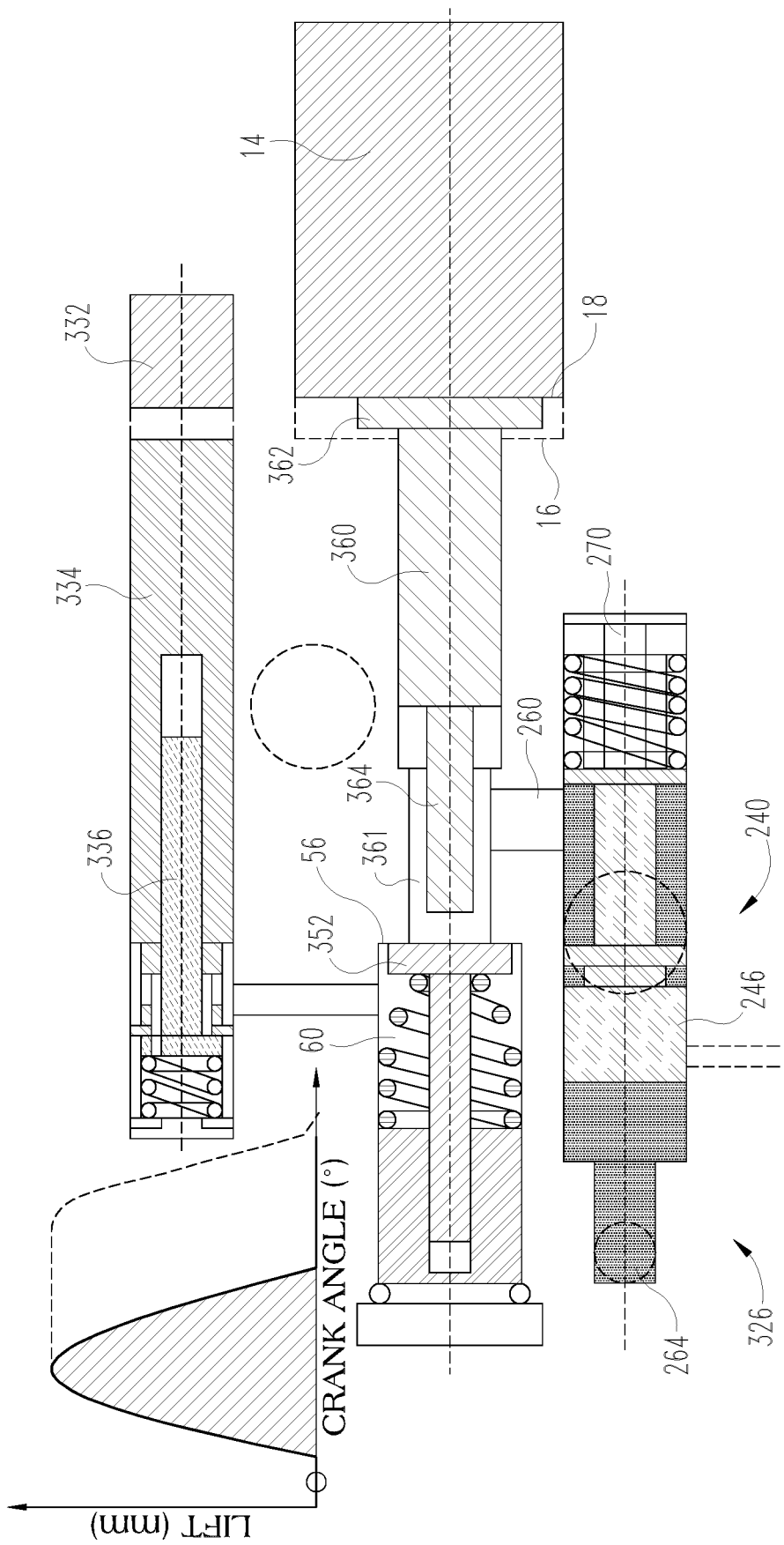
Figure 9F:
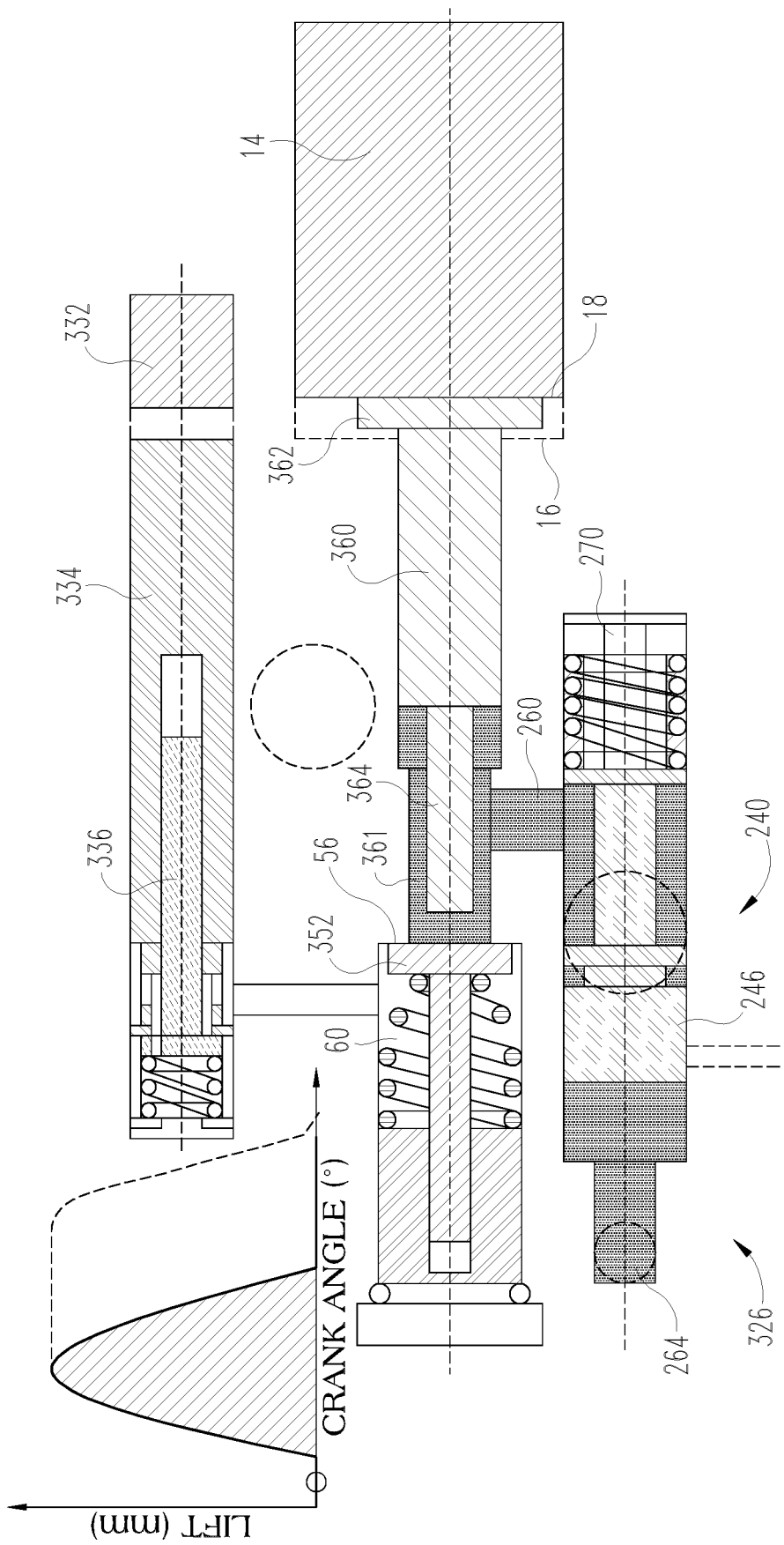
Figure 9G:
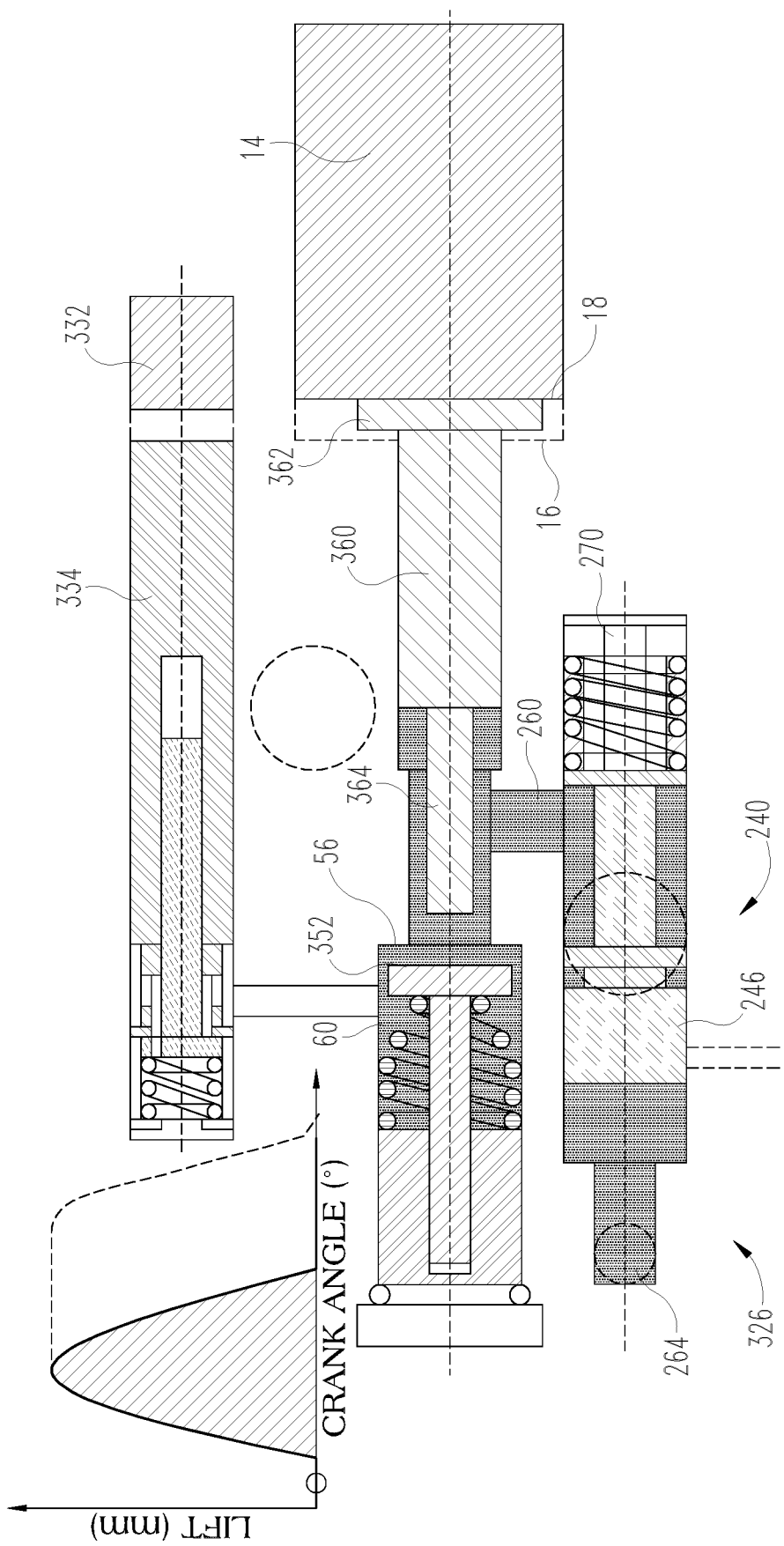

Referring to FIG. 9C, the control fluid supply 264 is deenergized, and disc 352 is spring biased into position against seat 56. In FIG. 9D the control fluid supply 264 is energized, which displaces actuating piston 246 so that the control fluid is in fluid communication with passage 260, as shown in FIG. 9E. The control fluid then flows into the passage 361 containing reset pin 360 as shown in FIG. 9F, which unseats disc 352 from seat 56, and control fluid flows into cavity 60, as shown in FIG. 9G.

Figure 9H:
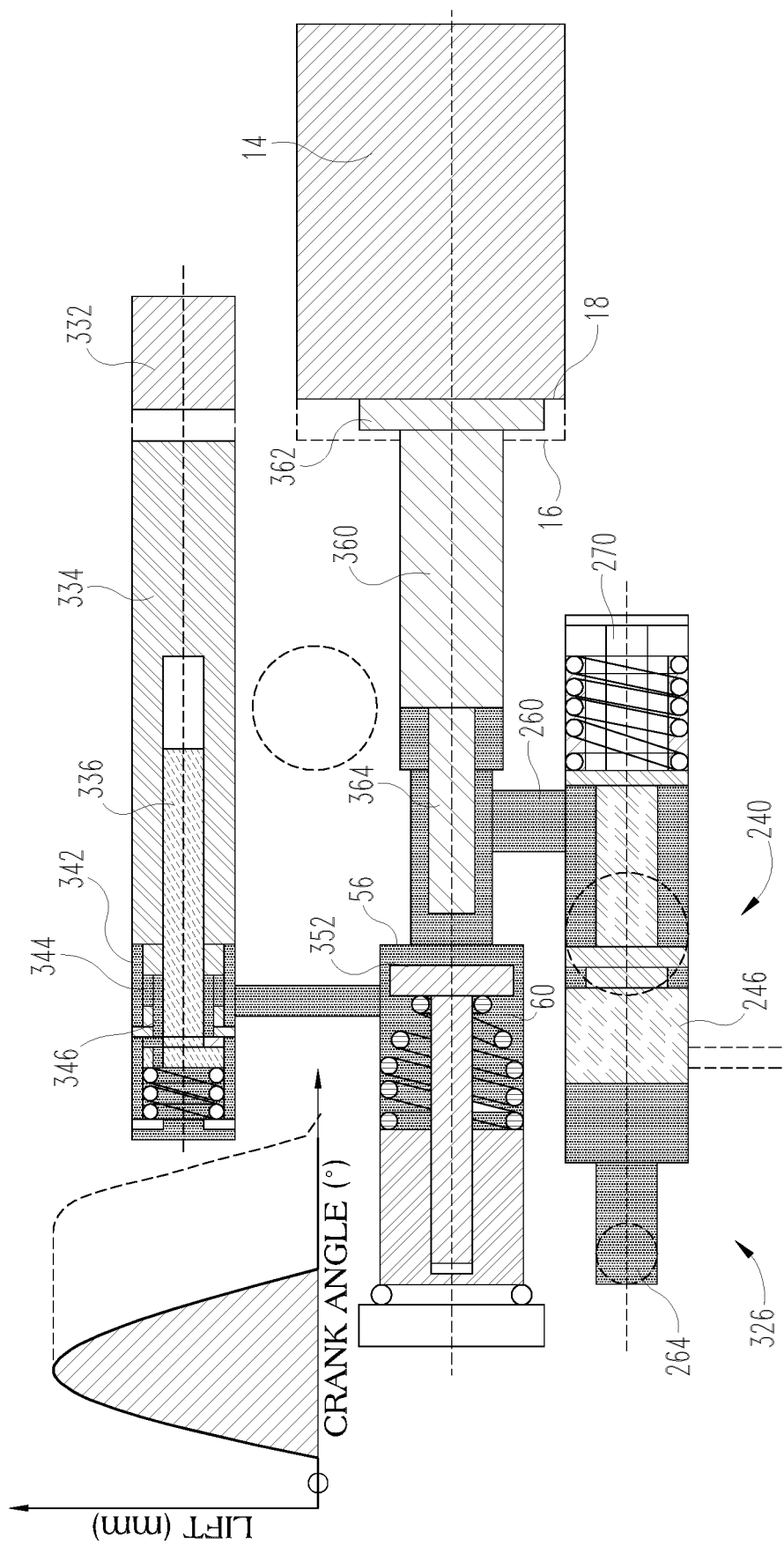
Figure 9I:
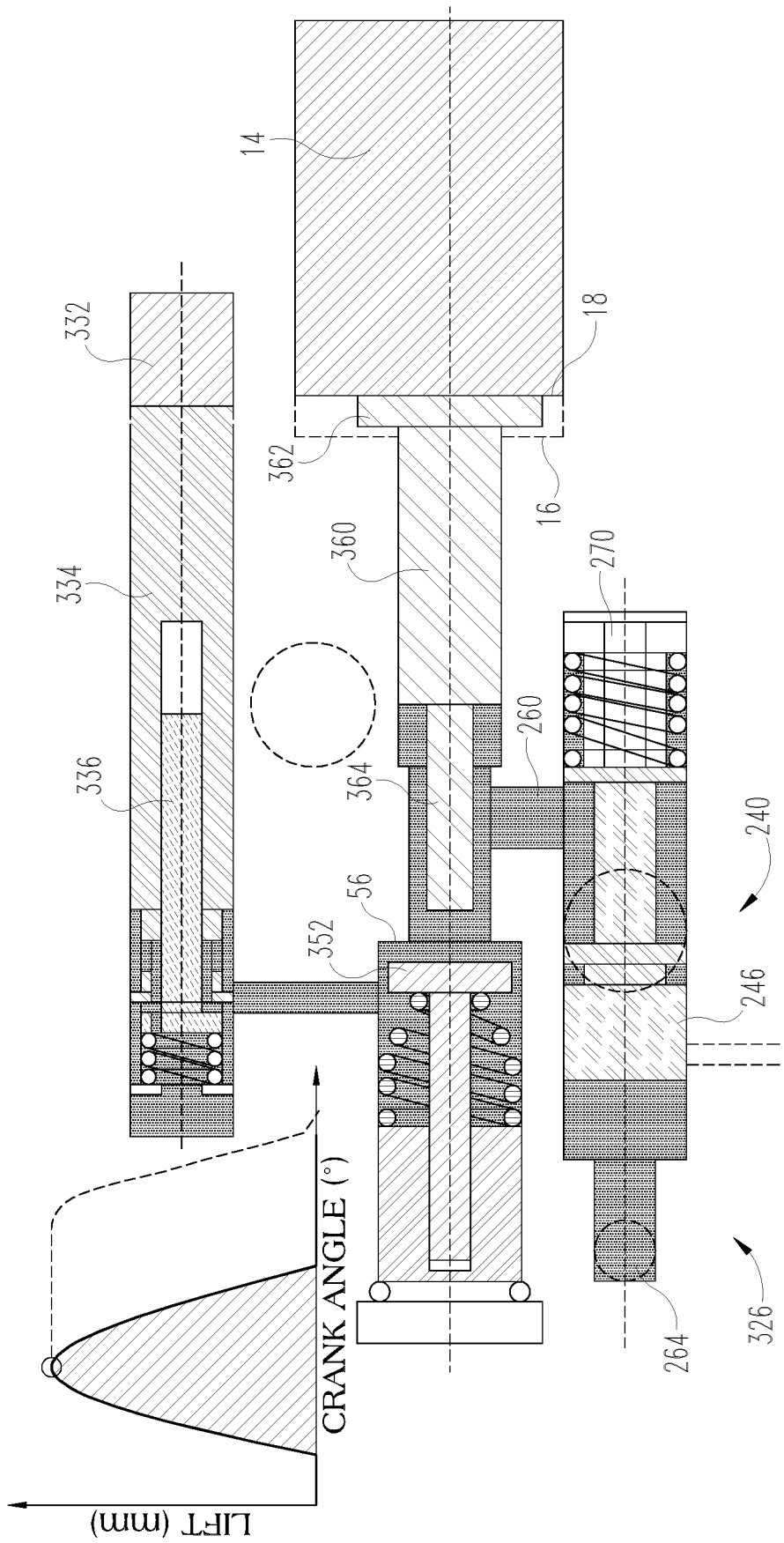
Figure 9J:
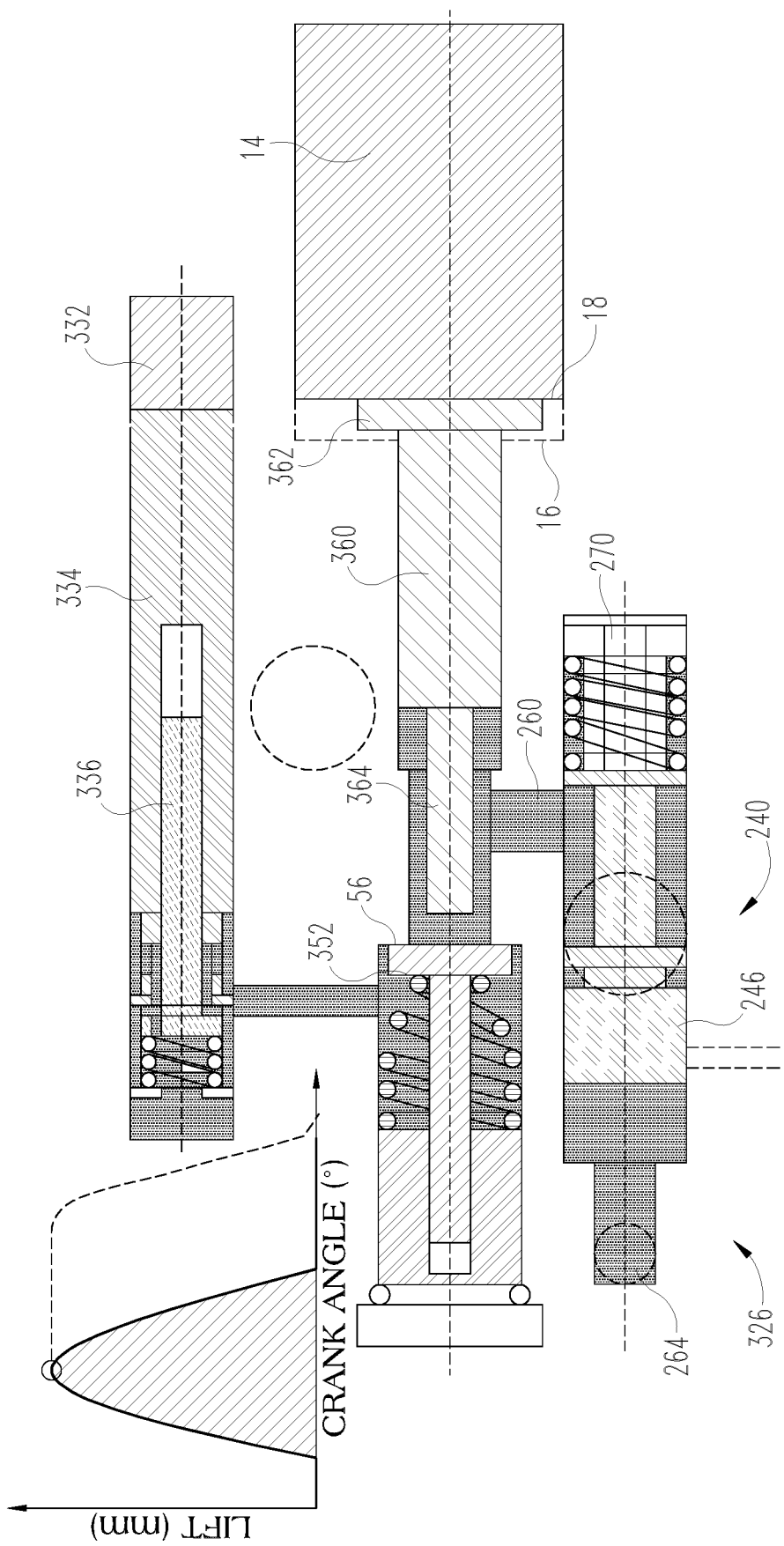
Figure 9K:
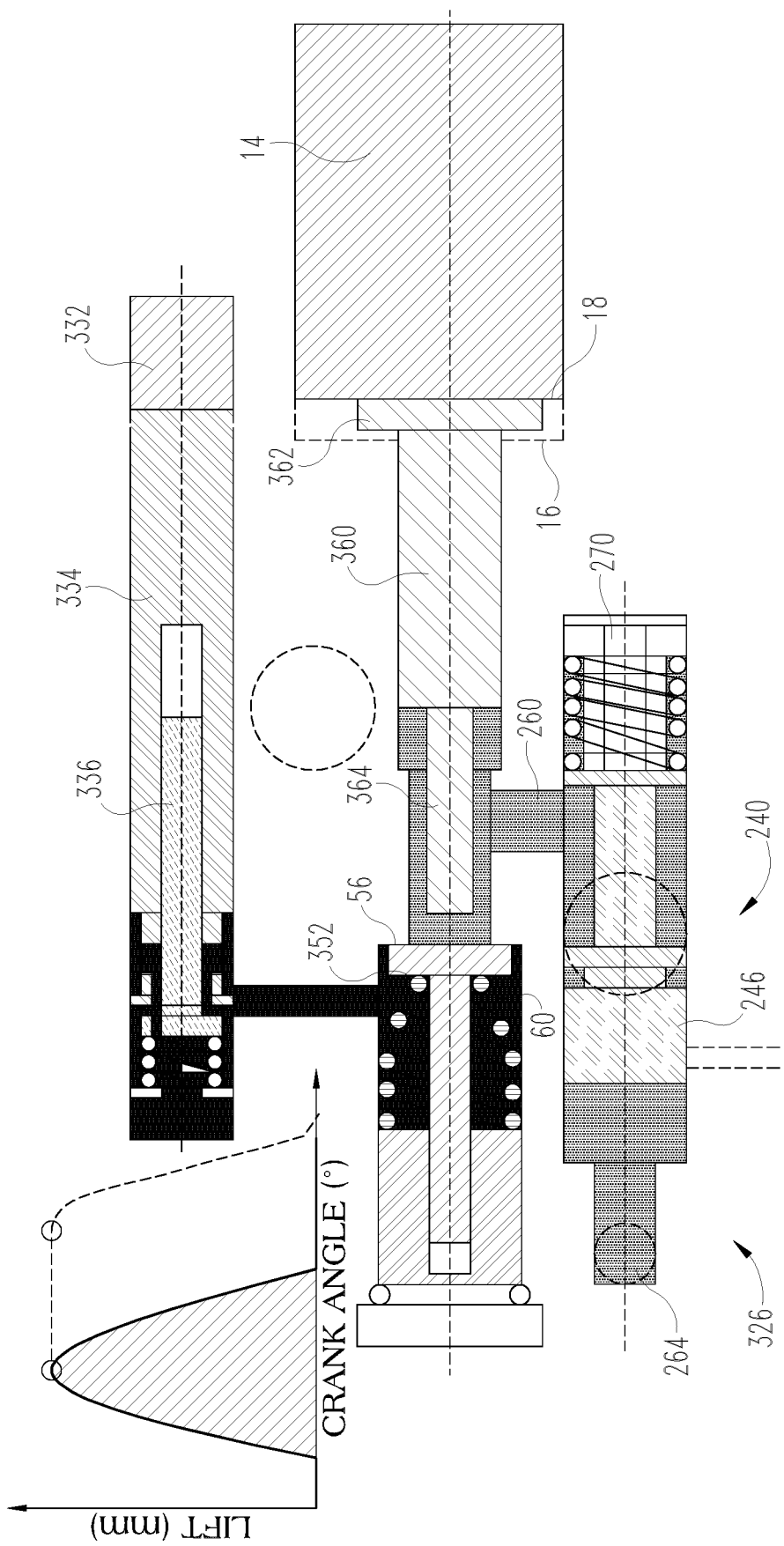

In FIG. 9H the control fluid has flowed into outer chamber 342, through bores 344, and into inner chamber 346. This displaces the holding member 334 away from the second check valve 336 so the holding member 334 can extend from the pedestal to contact the lever extension 332 extending from intake rocker 20 while the intake valve is at peek lift, as shown in FIG. 9I. The pressure of the control fluid then equalizes and seats disc 352 against seat 56, as shown in FIG. 9J. The second check valve 336 then seats against head 340 of holding member 334, which hydraulically locks the system, as indicated in FIG. 9K with the darkened control fluid in cavity 60, to maintain the intake valve opening.

Figure 9L:
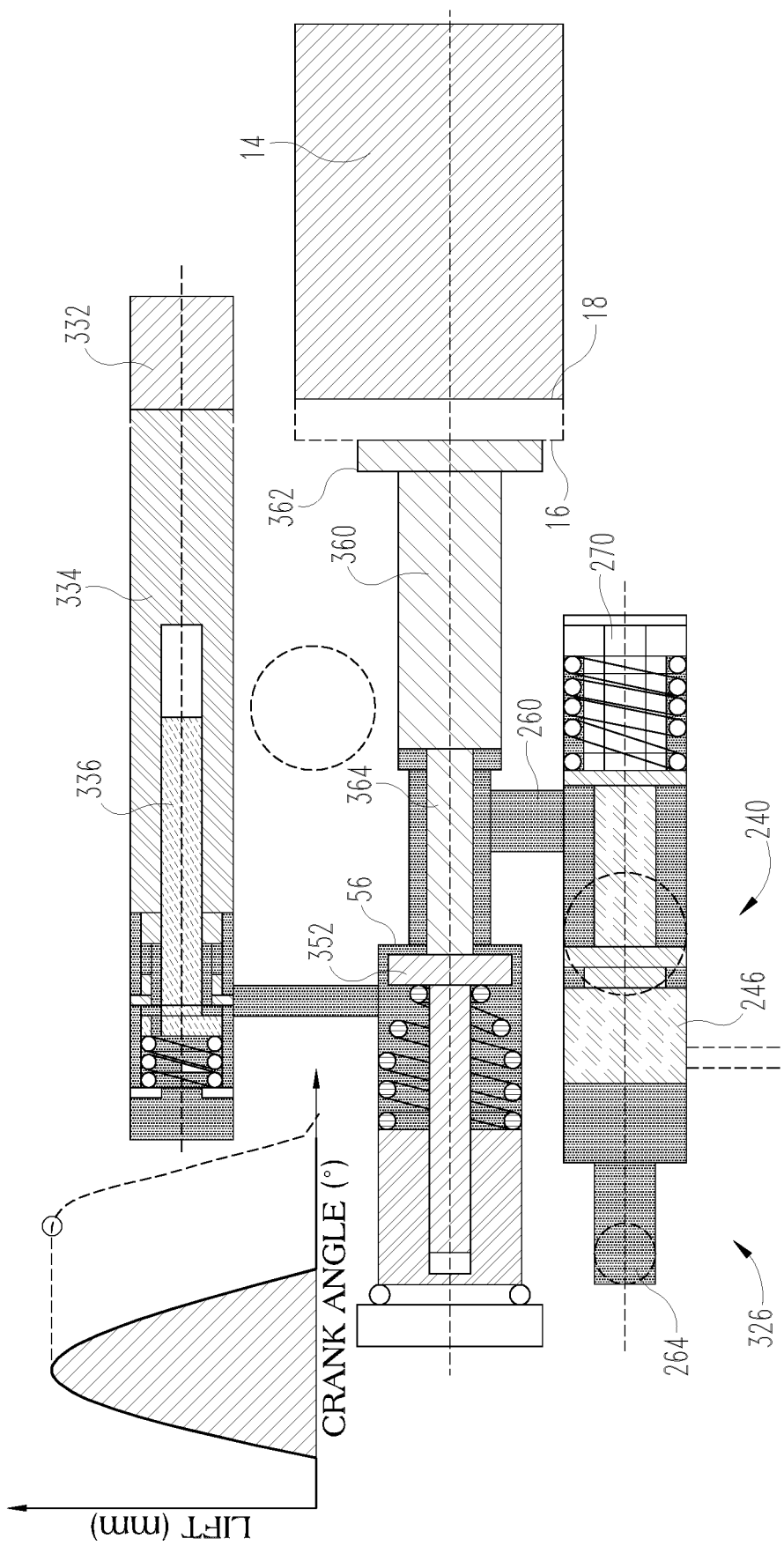
Figure 9M:
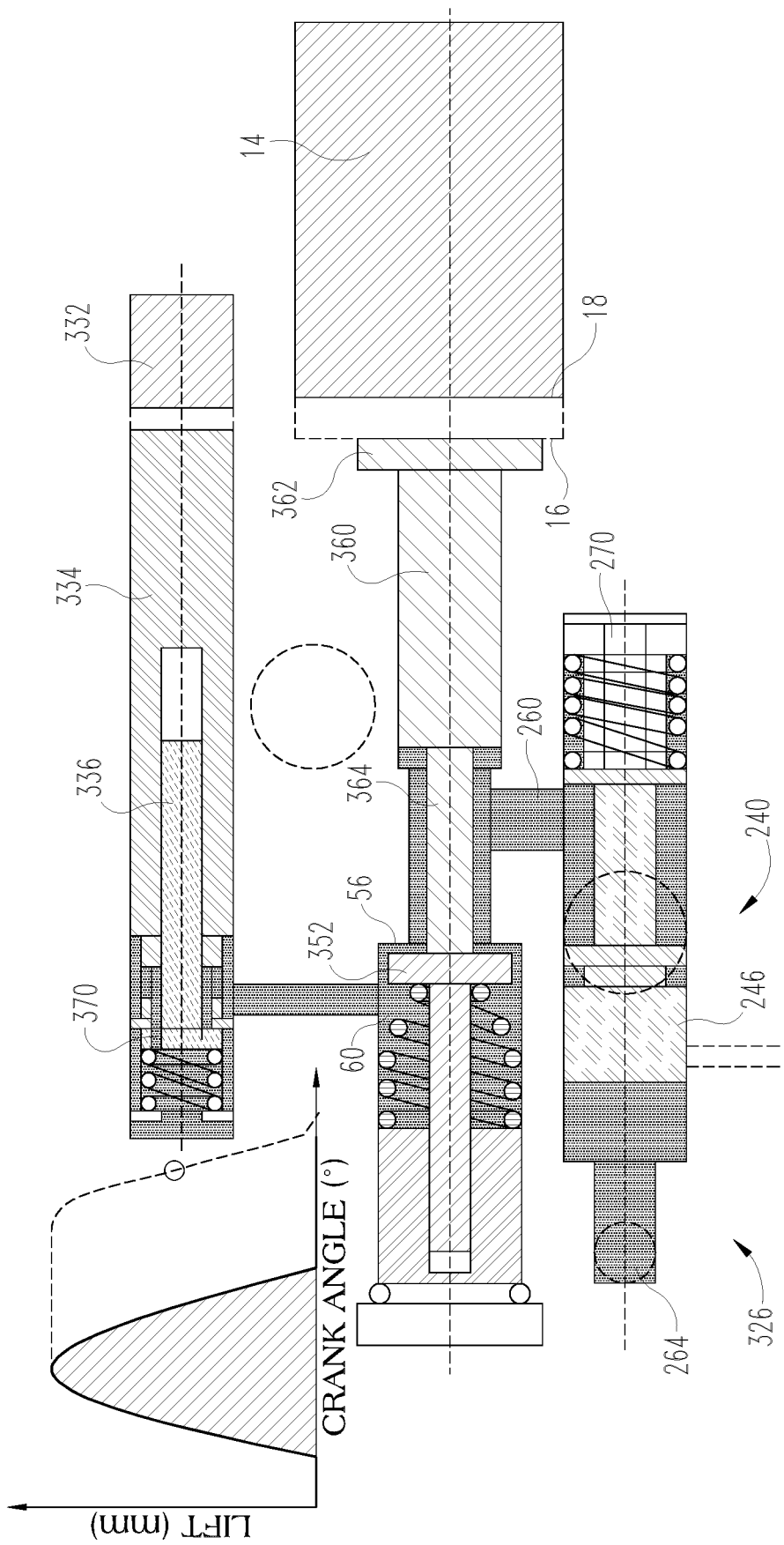
Figure 9N:
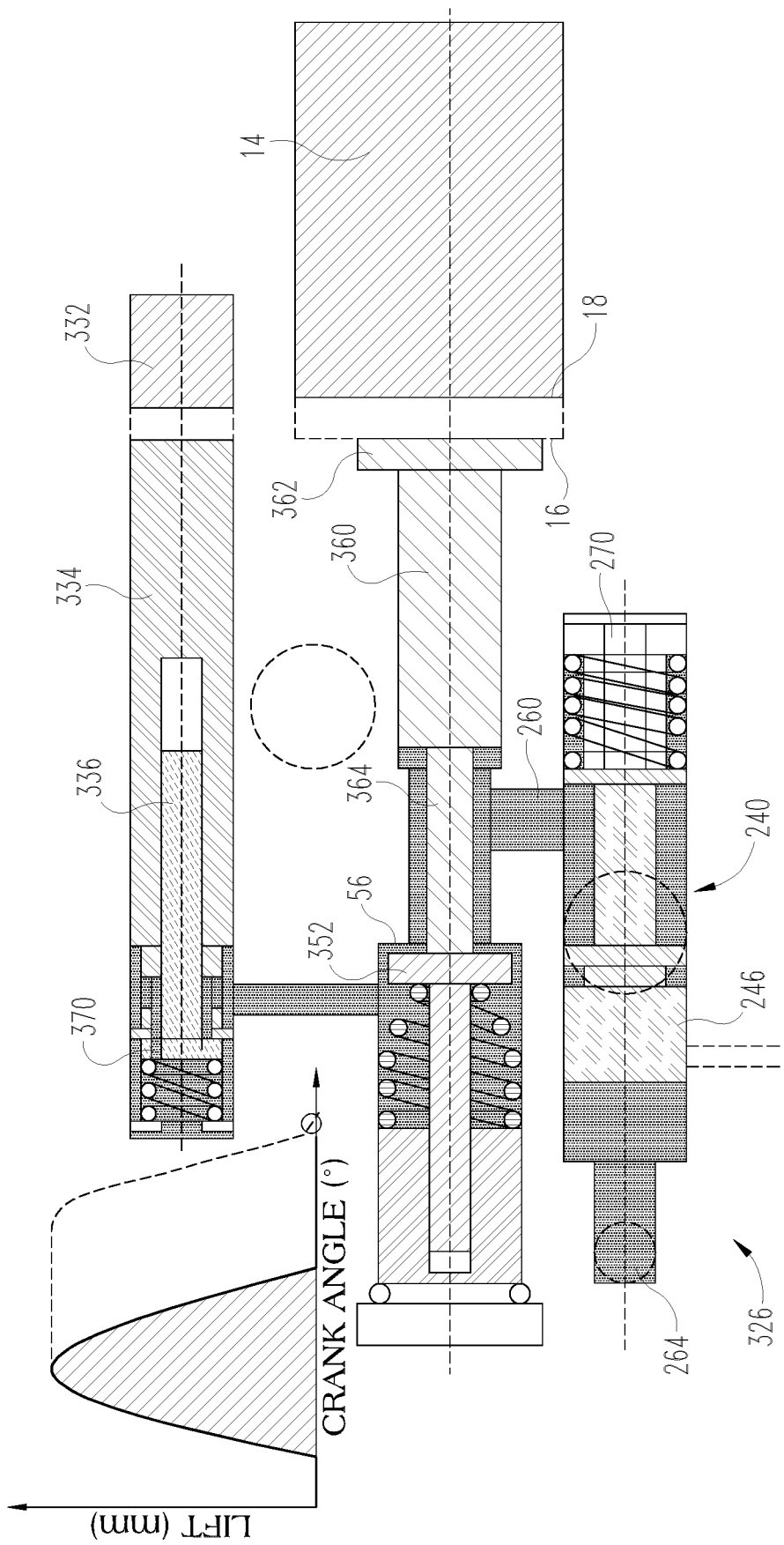
Figure 90:
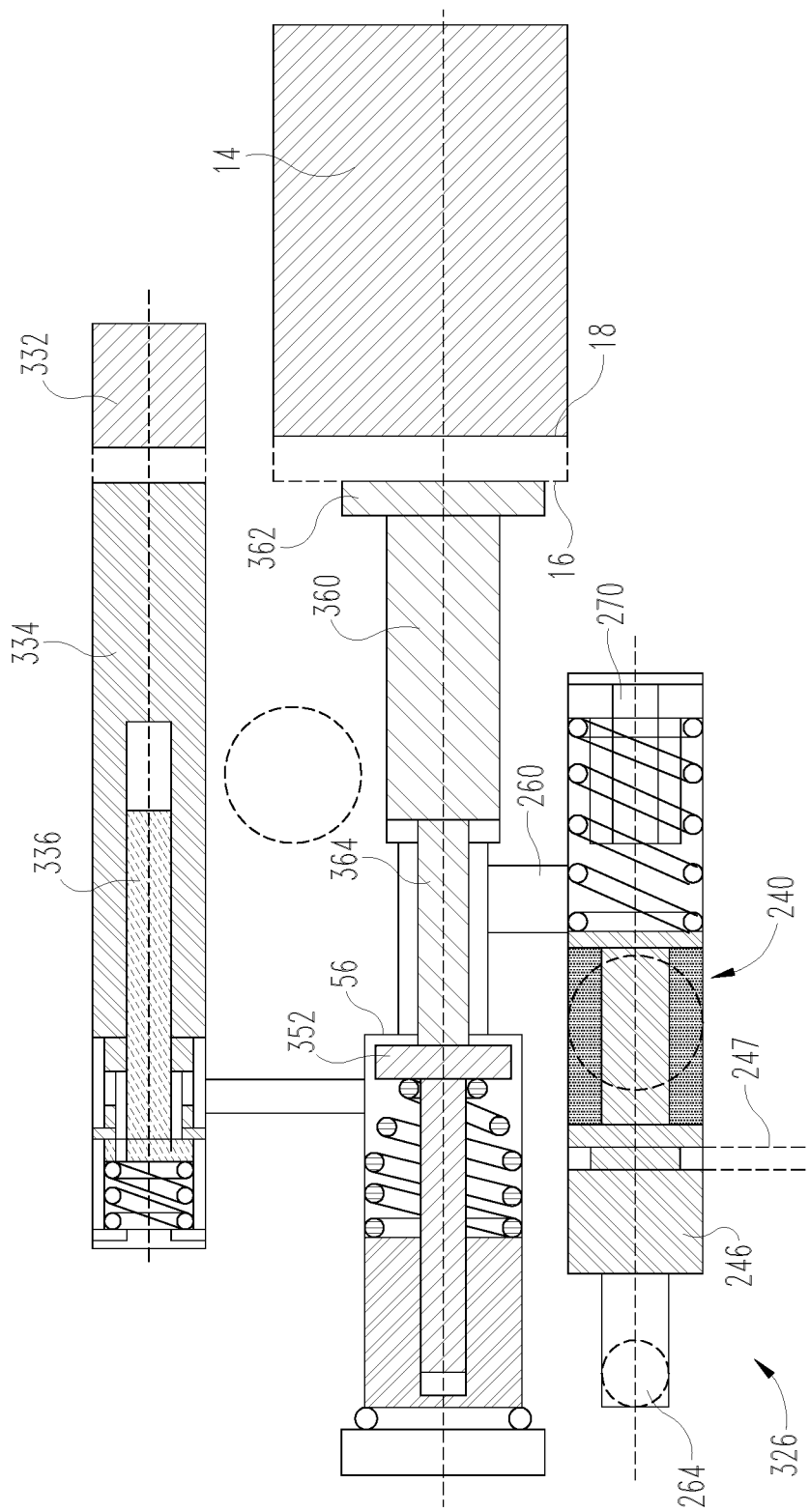

In FIG. 9L, the cam lobe 16 is in contact with foot 362 of reset pin 360, which pushes stem 364 against disc 352 to open the valve assembly 350. The pressure of the control fluid is relieved to the accumulator and the holding member 334 retracts along with second check valve 336 in cavity 372, as shown in FIGS. 9M and 9N. The seating velocity of the holding member 334 is controlled by the flow of control fluid through the flow control orifice 370. In FIG. 9N the control fluid supply 264 is deenergized, which allows actuating piston 246 to be displaced by the spring and isolate passage 260 from the control fluid supply 264. The control fluid pressure is vented through vent 270 and a vent port 247 as shown in FIG. 9O.

Various aspects of the present disclosure are contemplated as disclosed herein and as recited in the claims below. For example, a selectively activatable VVT assembly for one or more cylinders of an internal combustion engine is provided that is configured to operatively engage an intake valve to extend a duration of the intake valve in an open position in response to an extended duration mode of operation. The VVT assembly includes an intake rocker mounted on a pedestal and operable by a cam lobe to open and close the intake valve, and the intake rocker includes a lever extension. The assembly also includes a holding member in the pedestal lockable in position by a hydraulic circuit in the pedestal to contact the lever extension of the intake rocker and hold the intake valve in the open position. A reset pin in the pedestal is actuatable by the cam lobe to release the holding member to allow the intake valve to close.

In one embodiment, the internal combustion engine operates using a Miller cycle when the VVT assembly is not selected for activation.

In one embodiment, a cylinder head is provided that includes the intake valve and an intake port. The intake valve is moveable between an open position allowing intake gas to enter the cylinder through the intake port and a closed position that prevents intake gas from entering the cylinder through the intake port. A camshaft is rotatably mounted and includes an intake cam with the cam lobe. The cam lobe is operatively connected to the intake valve to periodically move the intake valve into the open and closed positions and shaped such that a timing of the closed position occurs at or before bottom dead center BDC of a compression stroke of a piston in the cylinder during a Miller cycle mode of operation. In one embodiment, the intake valve is held open until after BDC of the compression stroke of the piston during the extended duration mode of operation.

In one embodiment, the holding member includes a flow control orifice to control a fluid flow from a chamber housing the holding member into the hydraulic circuit.

In one embodiment, the hydraulic circuit is connected to a solenoid that is operable to pressurize a fluid in the hydraulic circuit to operate an actuating member that is displaced to allow the reset pin to extend from the pedestal to contact the cam lobe.

In one embodiment, the pressurized fluid locks the holding member in position during the extended duration mode of operation. In one embodiment, the reset pin contacts a valve assembly to hold the valve assembly open while the actuating member is positioned to maintain the reset pin in a retracted position in the pedestal.

In one embodiment, the valve assembly closes in response to the extension of the reset pin from the pedestal to isolate the pressurized fluid in a chamber containing the holding member while the holding member is in the extended position. In one embodiment, the valve assembly includes one of a ball and a disc that is spring biased to engage a seat in response to the reset pin being released to isolate the fluid in the chamber of the holding member In one embodiment, in response to the cam lobe actuating the reset pin, the reset pin is retracted into the pedestal to displace the one of the ball and the disc from the seat and release the pressurized fluid from the chamber of the holding member. In one embodiment, the solenoid is de-energized to de-pressurize the fluid and allow the actuating member to re-engage the reset pin in the retracted position.

In one embodiment, the actuating member isolates the fluid in the hydraulic circuit from the holding member when not in the extended duration mode of operation and the actuating member is displaced to open a fluid flow path to the holding member during the extended duration mode of operation.

In one embodiment, the holding member and the reset pin are normally biased into a retracted position in the pedestal.

Another exemplary aspect includes a selectively activatable VVT assembly that includes a pedestal for mounting adjacent to a cylinder of on an internal combustion engine and an intake rocker mounted on the pedestal and operable by a cam lobe to open and close an intake valve of the cylinder. The intake rocker includes a lever extension. The assembly includes a holding member extendable from the pedestal to contact the lever extension of the intake rocker and hold the intake valve in the open position. A reset pin is movable into the pedestal by the cam lobe to release the holding member to allow the intake valve to close.

In one embodiment, the holding member and the reset pin are normally biased into a retracted position in the pedestal. In one embodiment, the holding member includes a flow control orifice to control a fluid flow from a chamber housing the holding member into a hydraulic circuit in the pedestal.

In one embodiment, the reset pin contacts a valve assembly in the hydraulic circuit to hold the valve assembly open while the reset pin is in a retracted position in the pedestal. In one embodiment, the valve assembly closes in response to extension of the reset pin from the pedestal to isolate pressurized fluid in the chamber containing the holding member while the holding member is extended from the pedestal.

In one embodiment, the valve assembly includes one of a ball and a disc that is spring biased to engage a seat in response to the reset pin being extended from the pedestal to isolate the fluid in the chamber of the holding member. In response to the cam lobe moving the reset pin into the pedestal, the reset pin displaces the one of the ball and the disc from the seat and releases the pressurized fluid from the chamber of the holding member.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A selectively activatable variable valve timing (VVT) assembly for one or more cylinders of an internal combustion engine that includes a pedestal, the VVT assembly being configured to operatively engage an intake valve to extend a duration of the intake valve in an open position in response to an extended duration mode of operation, wherein the VVT assembly includes:
   an intake rocker mounted on the pedestal, the intake rocker operable by a cam lobe to open and close the intake valve, the intake rocker including a lever extension;
   a holding member in the pedestal lockable in position by a hydraulic circuit in the pedestal to contact the lever extension of the intake rocker and hold the intake valve in the open position; and
   a reset pin in the pedestal actuatable by the cam lobe to release the holding member to allow the intake valve to close.

2. The VVT assembly of claim 1, wherein the internal combustion engine operates using a Miller cycle when the VVT assembly is not selected for activation.

3. The VVT assembly of claim 1, further comprising:
   a rotatably mounted camshaft including an intake cam with the cam lobe, wherein the cam lobe is operatively connected to the intake valve to periodically move the intake valve into open and closed positions and shaped such that a timing of the closed position occurs at or before bottom dead center (BDC) of a compression stroke of a piston in a cylinder of the one or more cylinders during a Miller cycle mode of operation.

4. The VVT assembly of claim 3, wherein the intake valve is held open until after BDC of the compression stroke of the piston during the extended duration mode of operation.

5. The VVT assembly of claim 1, wherein the holding member includes a flow control orifice to control a fluid flow from a chamber housing the holding member into the hydraulic circuit.

6. The VVT assembly of claim 1, wherein the hydraulic circuit is connected to a solenoid that is operable to pressurize a fluid in the hydraulic circuit to operate an actuating member that is displaced to allow the reset pin to extend from the pedestal to contact the cam lobe.

7. The VVT assembly of claim 6, wherein the pressurized fluid locks the holding member in an extended position during the extended duration mode of operation.

8. The VVT assembly of claim 7, wherein the reset pin contacts a valve assembly to hold the valve assembly open while the actuating member is positioned to maintain the reset pin in a retracted position in the pedestal.

9. The VVT assembly of claim 8, wherein the valve assembly closes in response to an extension of the reset pin from the pedestal to isolate the pressurized fluid in a chamber containing the holding member while the holding member is in the extended position.

10. The VVT assembly of claim 9, wherein the valve assembly includes one of a ball and a disc that is spring biased to engage a seat in response to the reset pin being released to isolate the fluid in the chamber of the holding member.

11. The VVT assembly of claim 10, wherein in response to the cam lobe actuating the reset pin, the reset pin is retracted into the pedestal to displace the one of the ball and the disc from the seat and release the pressurized fluid from the chamber of the holding member.

12. The VVT assembly of claim 11, wherein the solenoid is de-energized to de-pressurize the fluid and allow the actuating member to re-engage the reset pin in the retracted position.

13. The VVT assembly of claim 6, wherein the actuating member isolates the fluid in the hydraulic circuit from the holding member when not in the extended duration mode of operation and the actuating member is displaced to open a fluid flow path to the holding member during the extended duration mode of operation.

14. The VVT assembly of claim 1, wherein the holding member and the reset pin are normally biased into a retracted position in the pedestal.

15. A selectively activatable variable valve timing (VVT) assembly, comprising:
   a pedestal for mounting adjacent a cylinder of on an internal combustion engine;
   an intake rocker mounted on the pedestal and operable by a cam lobe to open and close an intake valve of the cylinder, the intake rocker including a lever extension;
   a holding member configured to extend from the pedestal to a lockable position to contact the lever extension of the intake rocker and hold the intake valve in the open position; and a reset pin movable into the pedestal by the cam lobe to release the holding member to allow the intake valve to close.

16. The VVT assembly of claim 15, wherein the holding member and the reset pin are normally biased into a retracted position in the pedestal.

17. The VVT assembly of claim 15, wherein the holding member includes a flow control orifice to control a fluid flow from a chamber housing the holding member into a hydraulic circuit in the pedestal.

18. The VVT assembly of claim 17, wherein the reset pin contacts a valve assembly in the hydraulic circuit to hold the valve assembly open while the reset pin is in a retracted position in the pedestal.

19. The VVT assembly of claim 18, wherein the valve assembly closes in response to extension of the reset pin from the pedestal to isolate pressurized fluid in the chamber containing the holding member while the holding member is extended from the pedestal.

20. The VVT assembly of claim 19, wherein:
the valve assembly includes one of a ball and a disc that is spring biased to engage a seat in response to the reset pin being extended from the pedestal to isolate the fluid in the chamber of the holding member; and
in response to the cam lobe moving the reset pin into the pedestal, the reset pin displaces the one of the ball and the disc from the seat and releases the pressurized fluid from the chamber of the holding member.

* * * * *